(12) United States Patent
Zhang et al.

(10) Patent No.: US 8,411,938 B2
(45) Date of Patent: Apr. 2, 2013

(54) MULTI-SCALE MULTI-CAMERA ADAPTIVE FUSION WITH CONTRAST NORMALIZATION

(75) Inventors: Chao Zhang, Belle Mead, NJ (US); Peter Jeffrey Burt, Princeton, NJ (US); Gooitzen Sieman van der Wal, West Windsor, NJ (US)

(73) Assignee: SRI International, Menlo Park, CA (US)

( * ) Notice: Subject to any disclaimer, the term of this patent is extended or adjusted under 35 U.S.C. 154(b) by 1131 days.

(21) Appl. No.: 12/275,781

(22) Filed: Nov. 21, 2008

(65) Prior Publication Data

US 2009/0169102 A1   Jul. 2, 2009

Related U.S. Application Data

(60) Provisional application No. 60/991,100, filed on Nov. 29, 2007.

(51) Int. Cl.
*G06K 9/00*   (2006.01)

(52) U.S. Cl. ........ 382/162; 382/167; 382/284; 382/240; 382/302; 348/453

(58) Field of Classification Search .................. 382/162, 382/167, 284, 240, 302; 358/518–523; 348/453; 345/589, 590, 595, 604
See application file for complete search history.

(56) References Cited

U.S. PATENT DOCUMENTS

| 6,201,899 | B1 * | 3/2001 | Bergen | 382/284 |
| 7,492,962 | B2 * | 2/2009 | Zhang et al. | 382/274 |

OTHER PUBLICATIONS

In Ruderman, D. L., Cronin, T. W., and Chiao, C., "Statistics of Cone Responses to Natural Images: Implications for Visual Coding," JOSA A, 15(8), 2036-2045, 1998.
Burt, P. J. and Adelson, E. H., "The Laplacian pyramid as a compact image code," IEEE Trans. on Communications, COM-31, No. 4, 532-540, 1983.
Burt, P. J. and Kolczynski, R. J., "Enhanced image capture through fusion," Proc. International Conference on Computer Vision, 1993, May 11-14, 1993 pp. 173-182.
Li, Y., Sharan, L., and Adelson, E. H., "Compressing and companding high dynamic range images with subband architectures," ACM Transactions on Graphics (TOG), 24(3), Proceedings of SIGGRAPH, 2005.
Heeger, D. J., "Half-squaring in responses of cat striate cells," Visual Nerosci. 9, 427-443, 1992.

* cited by examiner

*Primary Examiner* — Ali Bayat
(74) *Attorney, Agent, or Firm* — Moser Taboada

(57) ABSTRACT

A computer implemented method for fusing images taken by a plurality of cameras is disclosed, comprising the steps of: receiving a plurality of images of the same scene taken by the plurality of cameras; generating Laplacian pyramid images for each source image of the plurality of images; applying contrast normalization to the Laplacian pyramids images; performing pixel-level fusion on the Laplacian pyramid images based on a local salience measure that reduces aliasing artifacts to produce one salience-selected Laplacian pyramid image for each pyramid level; and combining the salience-selected Laplacian pyramid images into a fused image. Applying contrast normalization further comprises, for each Laplacian image at a given level: obtaining an energy image from the Laplacian image; determining a gain factor that is based on at least the energy image and a target contrast; and multiplying the Laplacian image by a gain factor to produce a normalized Laplacian image.

38 Claims, 24 Drawing Sheets

MULTI-SCALE MULTI-CAMERA ADAPTIVE FUSION WITH CONTRAST NORMALIZATION

CROSS-REFERENCE TO RELATED APPLICATIONS

This application claims the benefit of U.S. provisional patent application No. 60/991,100 filed Nov. 29, 2007, the disclosure of which is incorporated herein by reference in its entirety.

GOVERNMENT RIGHTS IN THIS INVENTION

This invention was made with U.S. government support under contract number NBCHC030074. The U.S. government has certain rights in this invention.

FIELD OF THE INVENTION

The present invention relates generally to vision systems, and more particularly to a method and system for combining images from several sources of different bandwidths into a single "fusion" image by employing the technique of contrast normalization to optimize the dynamic range of pre-fused images.

BACKGROUND OF THE INVENTION

Soldiers often find themselves in situations in which there is reduced or no visibility of the battlefield, especially at night. There is a need for providing visual information to soldiers in nighttime environments and day or night environments with visual obstructions such as fog or smoke. In such situations, the soldier may be equipped with soldier-worn, hand-held, and/or vehicle-based night vision and enhanced-vision systems. These systems enhance visibility in the visible range of frequencies of electromagnetic radiation, or provide "sight" in the infrared range of frequencies.

An improvement over individual systems that provide visibility over a single range of frequencies of electromagnetic radiation or combine visibility in several ranges of frequencies with different pieces of equipment is to combine the video of a long wave infrared (LWIR) source, a short wave infrared (SWIR) source and a standard visible source, into a single image using a single piece of equipment, thereby providing significantly enhanced visibility of the scene. Another example is combining video from two cameras that point at the same scene, but with different focal length, providing enhanced depth of focus. A third example is combining video from two cameras that have a different aperture setting, providing significantly enhanced dynamic range to the display. In all these applications, it is desirable to preserve the most significant details from each of the video streams on a pixel-by-pixel basis. Such systems employ a technique known in the art as image fusion.

One image fusion technique known in the art is to perform an averaging function of the multiple video streams. However, contrast is reduced significantly and sometimes detail from one stream may cancel detail from another stream. Laplacian pyramid fusion on the other hand provides excellent automatic selection of the important image detail for every pixel from multiple images at multiple image resolutions. By performing selection in the multi-resolution representation, the reconstructed—fused—image provides a more natural-looking scene. In addition, the Laplacian pyramid fusion algorithm allows for additional enhancement of the video. It may provide multi-frequency sharpening, contrast enhancement, and selective de-emphasis of image detail in either video source.

However, current multi-scale, feature-selective fusion techniques employing Laplacian pyramid decomposition/construction do not work well on high dynamic range (HDR), high noise imagery. Performing dynamic range adjustment on the input images before fusion may ameliorate some of these problems. Various techniques such as histogramming and linear stretching have been introduced to take better advantage of the input image dynamic range. But these techniques still do not adequately deal with localized areas of low contrast and do not address issues associated with noise in the input images.

Accordingly, what would be desirable, but has not yet been provided, is a method and system for effectively and automatically fusing images from multiple cameras of different frequency bands (modalities) that benefit from the advantages of Laplacian pyramid decomposition/construction while being immune to low contrast and the presence of noise.

SUMMARY OF THE INVENTION

The above-described problems are addressed and a technical solution is achieved in the art by providing a computer implemented method for fusing images taken by a plurality of cameras, comprising the steps of: receiving a plurality of images of the same scene taken by the plurality of cameras; generating Laplacian pyramid images for each source image of the plurality of images; applying contrast normalization to the Laplacian pyramids images; performing pixel-level fusion on the Laplacian pyramid images based on a local salience measure that reduces aliasing artifacts to produce one salience-selected Laplacian pyramid image for each pyramid level; and combining the salience-selected Laplacian pyramid images into a fused image. Performing pixel-level fusion further comprises, for each level of the Laplacian pyramid images corresponding to each source image of the plurality of images: passing a Laplacian pyramid image through a filter which average each pixel with surrounding pixels; convolving the filtered Laplacian pyramid image with the absolute value of the Laplacian pyramid image to produce an energy image; generating a selection mask wherein a pixel at a given location is selected based on comparing the energy of the pixels originating from energy images corresponding each of the source images; and multiplying the selection mask by a filter to reduce aliasing artifacts by smoothing the contributions to the selection mask from each of the energy images to produce a contribution image. The contribution images corresponding to each of the source images may be summed to produce the salience-selected Laplacian pyramid image at one level of a Laplacian pyramid.

The pixel that is selected at a given location is the pixel among the energy images corresponding to each source image which has the highest energy when only one pixel has the highest energy; otherwise, partial contributions from each of the pixels from each of the sources which have about the same energy are selected. A selected pixel may be incremented by a hysteresis factor to reduce flickering artifacts.

The original image is decomposed into multiscale, multi-spectral Laplacian images and a Gaussian image. The Gaussian image contains the lowest frequency and is least scaled. The collection of the Laplacians and the Gaussian is called a Laplacian pyramid. If the pyramid is n levels, then the Gaussian image is the $(n-1)^{th}$ level (the highest level).

The step of generating Laplacian pyramid images further comprises the steps of: generating a Gaussian pyramid for at least one of the plurality of images; and applying noise coring to at least the Level 0 Gaussian image of the Gaussian pyramid to produce a noise-cored Laplacian image. Applying noise coring further comprising the steps of: processing at least the Level 0 Gaussian image substantially simultaneously through a plurality of derivative (gradient) filters to produce a first set of gradient images; applying a noise coring function to each of the gradient images; processing the noise cored gradient images substantially simultaneously through a second set of derivative (gradient) filters; and negatively summing the resulting filtered/cored images to produce the noise-cored Laplacian image.

Applying contrast normalization further comprises the steps of, for each Laplacian image at a given level: obtaining an energy image from the Laplacian image; determining a gain factor that is based on at least the energy image and a target contrast; and multiplying the Laplacian image by a gain factor to produce a normalized Laplacian image. The target contrast may be halved with increasing pyramid level. The gain factor may undergo noise coring. The degree of noise coring may be halved with increasing pyramid level. A saturation mask may be applied to the gain factor.

Contrast normalization of the Gaussian image proceeds as follows. First, the maximum pixel value of the image is computed and used as the contrast target. The gain factor is based on Gaussian image and the target contrast, and multiplying the Gaussian image by the gain factor produces a normalized Gaussian image. The normalized Gaussian image may be further decomposed into a DC value (average value of the image) and a signed AC image. The DC value is adjustable and is defined as the brightness of the image.

A non-uniformity correction (NUC) may be applied to each of the plurality of images to produce corrected images. At least one of linear stretching, uniform histogram equalization, Rayleigh shape histogram equalization, Gaussian shape histogram equalization, and gamma correction may be applied to each of the plurality of images to produce preprocessed images. The preprocessed images may be warped to align the preprocessed images to each other.

If the images to be fused contains a visible image, that image may be separated into a luminance component and chrominance components, wherein the luminance component is contrast normalized and undergoes image fusion, and the chrominance component is combined with the fused image to produce a color enhanced fused image. A luminance damping function may be applied to the luminance component; and a gamma correction may be applied to the chrominance components. The chrominance components may be orthogonalized.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION OF THE INVENTION

Figure 1A:
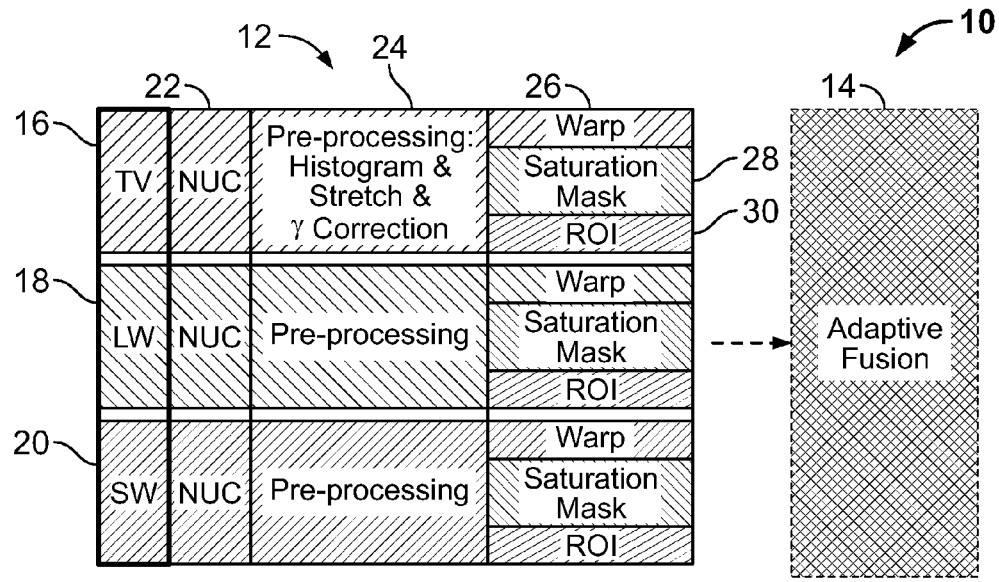
FIGS. 1A and 1B are block diagrams of a system and method that employs contrast normalization and adaptive fusion for combining images from a plurality of images of different modalities, constructed in accordance with an embodiment of the present invention.
Figure 1B:
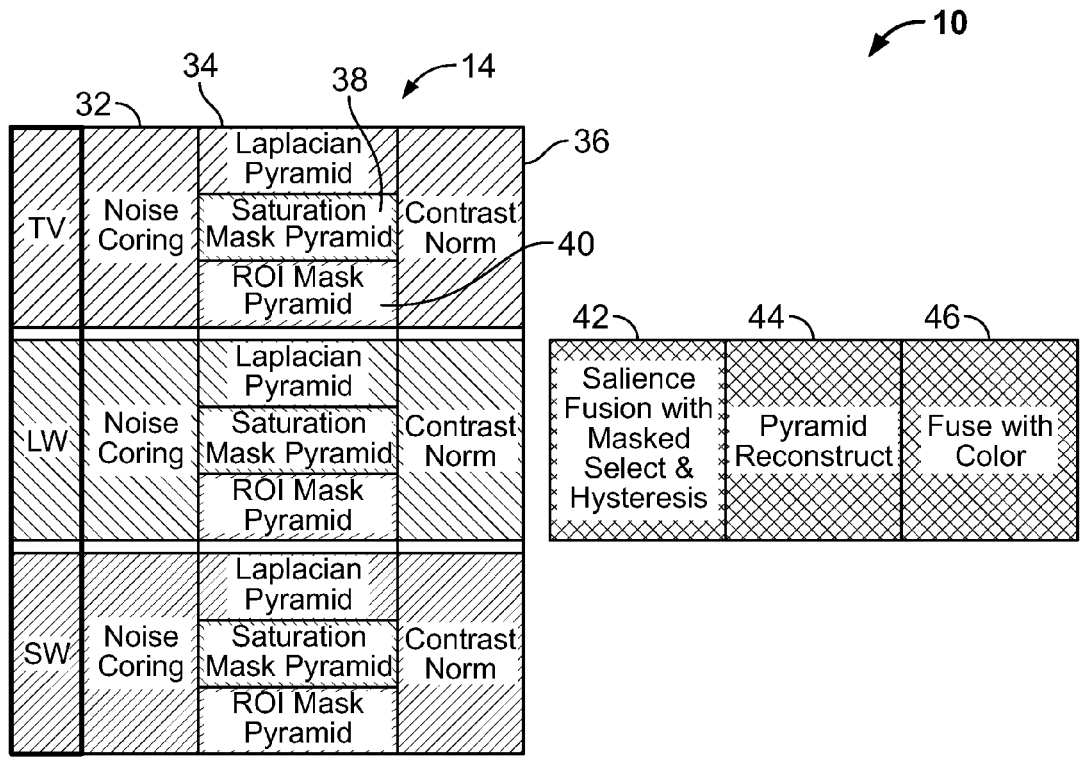

Referring now to FIGS. 1A and 1B, block diagrams of a system that employs adaptive fusion for combining images from a plurality of images of different modalities is depicted, constructed in accordance with an embodiment of the present invention, and generally indicated at 10. The system 10 in FIG. 1A includes a section 12 for the preparation of source image data originating from a plurality of modal images 16, 18, 20 (e.g., visible (TV), the long wave (LW) IR and the short wave (SW) IR images) taken by cameras (not shown) that are to be passed to an adaptive fusion block 14 (see FIG. 1B) are distortion corrected and pre-processed before they are warped to align to each other. Distortion correction is performed using Non-Uniformity Correction (NUC) 22 to compensate for gain and offset of each of the pixels of the images 16, 18, 20. The pre-processing enhancements in pre-processing blocks 24 include a linear stretching, uniform histogram equalization, Rayleigh and Gaussian shape histogram equalization, and gamma correction. A weighted factor is used to enable mixing of the linear stretch with other histogram equalization methods. The enhanced images are then aligned to each other (warped) in a warp block 26. A saturation mask 28 is generated based on threshold setting. At the same time, a region-of-interest (ROI) mask 30 is created for dynamically excluding non-overlapping input regions of the images 16, 18, 20. The saturation mask 28 is used in a contrast normalization blocks 36, and the ROI mask 30 affects selection in the salience fusion blocks 42 of the adaptive fusion block 14 (see FIG. 1B).

Treated as part of the Laplacian pyramid generation process, at level 0 only, gradient images (not shown) are created prior to Laplacians for each of the images 16, 18, 20. Noise coring at blocks 32 is applied to these gradient images to remove noise from input (pre-fused) images. In the Laplacian Pyramids 34 block, Laplacian cored images are generated from these noise-reduced gradient images at least at level 0. Laplacian images from other levels may be directly generated from the filter-subtract-decimate (FSD) coring of the Gaussian image representations of the source images 16, 18, 20 or the warped source images. The decimation depends on the sampling of the pyramid. In a preferred embodiment, Laplacian fusion of the present invention is applied to luminance images (i.e., not including chrominance portions in a YUV format). Laplacian Pyramids are also created in blocks 38 from the saturation masks 28 and in blocks 40 from the region-of-interest (ROI) mask 30. The Laplacian images of each of the modalities at all levels are then contrast normalized at blocks 36 with the aid of the generated saturation mask Laplacian pyramids in blocks 40 to optimize the dynamic rage of the pre-fused images. Up to this point, the pre-fused images are noise reduced, enhanced, and normalized across all modalities. Adaptive fusion using salience-selection is performed in blocks 42 based on a local salience measure and a hysteresis factor that reduces aliasing and flickering artifacts. The ROI mask pyramids are employed during selection to enhance blending during the fusion step by dynamically excluding non-overlapping input regions of input images. The resulting fused image is reconstructed in block 44 from the fused pyramid. After reconstruction from the fused pyramid, the fused monochromatic image is combined with color in block 46 from the visible input image 16. Color enhancement and correction is also performed in block 46 to scale and boost the color component from the visible camera by matching the discrepancy between the luminance image before and after image fusion.

Figure 2:
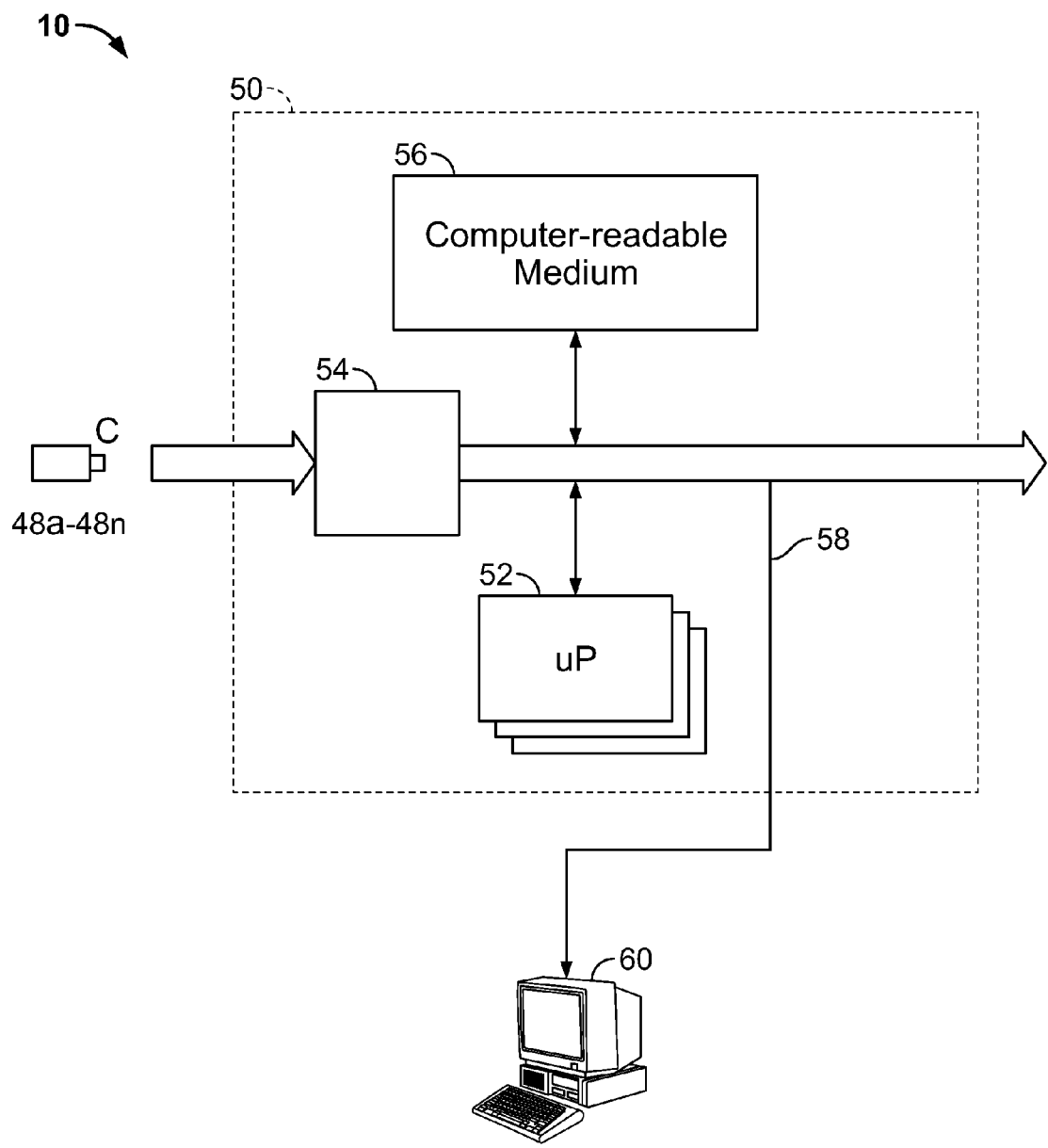
FIG. 2 is a block diagram of a hardware architecture which implements the adaptive fusion method with contrast normalization employed in FIGS. 1A and 1B, constructed in accordance with an embodiment of the present invention.

Referring now to FIG. 2, an illustrative embodiment of the hardware for implementing the system 10 is depicted. By way of a non-limiting example, the system 10 receives a plurality of digitized still images or video datastreams 48a-48n either directly from a video capturing system or indirectly via the Internet. The system 10 may comprise a computing platform 50. The computing platform 50 may include a personal computer or work-station (e.g., a Pentium-M 1.8 GHz PC-104 or higher) comprising one or more processors 52 which includes a bus system 54 which is fed by the video data streams 48a-48n via the one or more processors 52 or directly to a computer-readable medium 56. The computer readable medium 56 may also be used for storing the instructions of the system 10 to be executed by the one or more processors 52, including an operating system, such as the Windows or the Linux operating system and the image fusion method of the present invention to be described hereinbelow. The computer readable medium 56 may further be used for the storing and retrieval of the input or fused images. The computer readable medium 56 may include a combination of volatile memory, such as RAM memory, and non-volatile memory, such as flash memory, optical disk(s), and/or hard disk(s). In one embodiment, the non-volatile memory may include a RAID (redundant array of independent disks) system configured at level 0 (striped set) that allows continuous streaming of uncompressed data to disk without frame-drops. In such a system, the fused images/video data stream may be stored temporarily in the computer readable medium 56 for later output. An output data stream 58 may feed the images/video data stream to a display device 60, which may be part of soldier-worn, hand-held, and/or vehicle-based night vision and enhanced-vision systems or simply a monitor.

In other embodiments, the computing platform 50 may be embodied in a single integrated circuit, which may be a digital signal processor, an field-programmable gate array (FPGA), an application-specific integrated circuit (ASIC) either standing alone or placed under the control of an external processor.

In a typical hardware implementation, the cameras used for generating the images 16, 18, 20 have different formats and operate with different numbers of data bits. For example, images from TV 16 may have a Bayer format with 10-bit data, images from SW IR 18 and LW IR 20 may have a 14-bit black and write format. Although the present invention is not limited to any particular format or number of data bits, the present invention will be described as having a 16-bit data format except for the color component.

Focal-plane array (FPA) sensors used in visible-light and infrared imaging systems are known to have fixed (or static) pattern noise superimposed on a true (i.e., noise free) image. The fixed pattern noise is attributed to spatial non-uniformity in the photo-response (i.e., the conversion of photons to electrons) of individual detectors in an array of pixels which constitute the FPA. The response is generally characterized by a linear model:

$$S(x,y)=a(x,y) \cdot I(x,y)+b(x,y), \quad (1)$$

where S(x,y) is the true signal of a single detector (pixel) I at (x,y) in an array of pixels that are modeled as being arranged in a rectangular coordinate grid (x,y) at time t, a(x,y) is the gain, and b(x,y) is the offset. Generally speaking, gain and offset are both a function of time, as they drift slowly along with the temperature change. The present invention employs a two-point NUC to solve for the gain a(x,y) and the offset b(x,y) which are read from a lookup table.

A histogram and linear stretching pre-processing enhancement is performed on the input images in pre-processing blocks 24 of FIG. 1A. In many instances, input data describing pixel values in the input images are often of size 16 bits, a dynamic range that usually does not cover a full hexadecimal representation. In order to find the range of each input image, the histogram of the image is calculated. The lower bound of the image (LB) is defined as the leftp percentage of distribution above the minimum value in the histogram, where leftp is the left bound in histogram; and the higher bound (HB) is the rightp percentage of distribution below the maximum value in the histogram, where rightp is the right bound in histogram. The image is then stretched and mapped into a k-bit representation:

$$S^S(x, y) = bound\left\{ \frac{S(x, y) - LB}{HB - LB} \cdot (2^k - 1) \right\} \quad (2)$$

where LB and HB are lower bound and higher bound respectively, S(x,y) is the input signal to the Histogram and stretch block. bound{ } is a cutoff function that ensures the output data is in the range of [0, $2^k$–1]. In an illustrative embodiment, the image has a default 12-bit representation after pre-processing.

For some camera sources, in some embodiments, other image enhancement methods may be considered, which may include for uniform histogram equalization, damped histogram equalization, histogram specification, etc.

Figure 3:
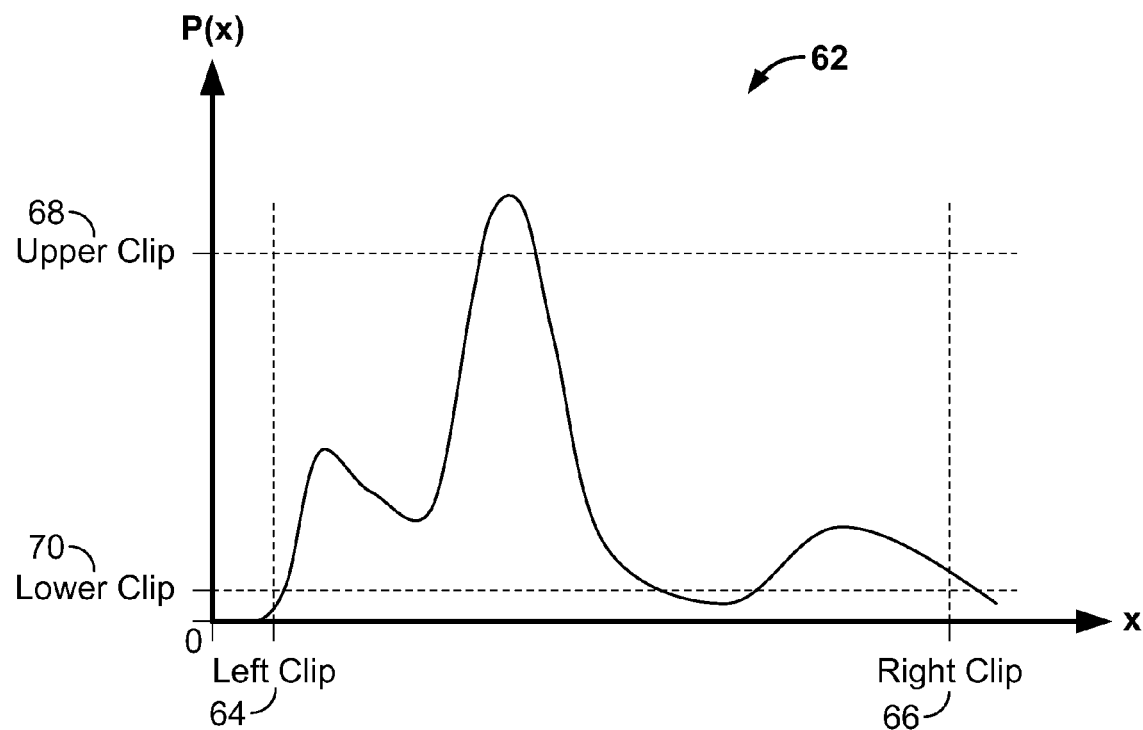
FIG. 3 is a plot of a histogram distribution function that may be graphed from the histogram obtained in the histogram and linear stretching pre-processing step of FIG. 1A.

Referring now to FIG. 3, there is shown an exemplary histogram distribution function 62 that may be graphed from the histogram obtained in the histogram and linear stretching pre-processing step, which is often regarded as the probability density function (pdf). In some embodiments, the histogram distribution function 62 may be clipped at various points, which may include a left clip 64, a right clip 66, an upper clip 68 and a lower clip 70. The left clip 64 and the right clip 66 may correspond to the leftp and rightp values obtained during the histogram and linear stretching pre-processing enhancement. In addition to limiting left and right portions of the histogram distribution function 62, histogram clipping may also be applied to limit the minimum and maximum distribution values. Therefore, in some embodiments, the cumulative distribution function (cdf) may be altered to exclude any regions below the lower clip 70 and beyond the upper clip 68.

Damped histogram equalization may be used to apply a weight mapping between pure uniform histogram equalization and linear stretching. Damped histogram equalization may balance between over-saturation from the histogram equalization and sub-amplification from the linear stretching. The histograms may be weighted by a weight factor between the linear stretch and the histogram equalization.

Figure 4:
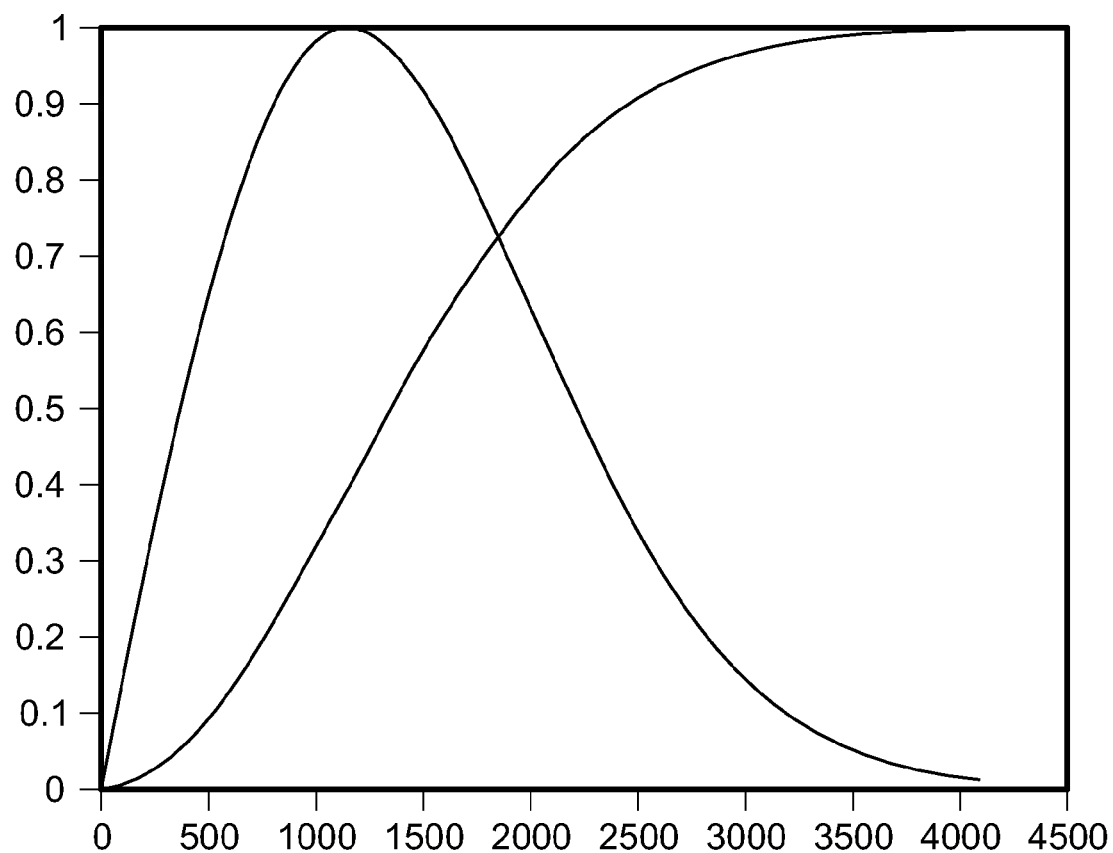
FIG. 4 is a plot of a Rayleigh transform that may be employed in the pre-processing step of FIG. 1A.

Other pre-processing methods that may be used as alternative to histogram clipping and then weighting applied between the linear stretch and the histogram specific functions. These pre-processing methods include Rayleigh and Gaussian shape histogram equalization. All of these histogram specific functions are designed for comparison with the contrast normalization approach, which is described herein below. The pdf function P(x) and the cumulative function D(x) for the Rayleigh transform are plotted in FIG. 4 and are defined as follows:

$$P(x) = \frac{x}{\sigma^2} e^{-\frac{x^2}{2\sigma^2}}, \quad (3)$$

where $\sigma^2$ is the variance, and $$D(x) = 1 - e^{-\frac{x^2}{2\sigma^2}}, \quad (4)$$

Figure 5A:
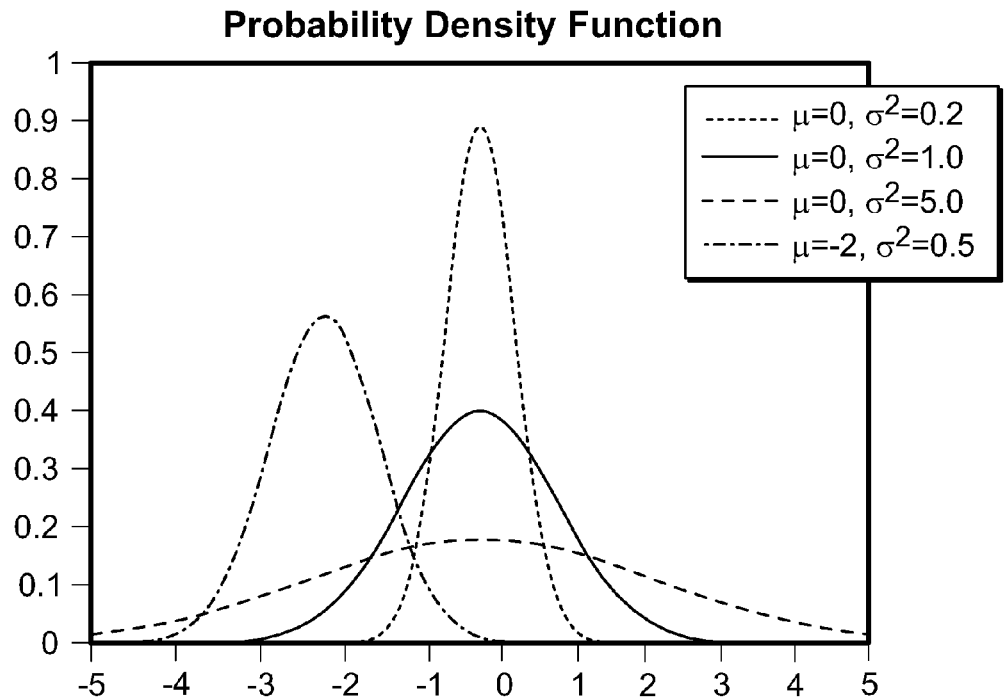
FIG. 5 is a plot of a Gaussian transform that may be employed in the pre-processing step of FIG. 1A.
Figure 5B:
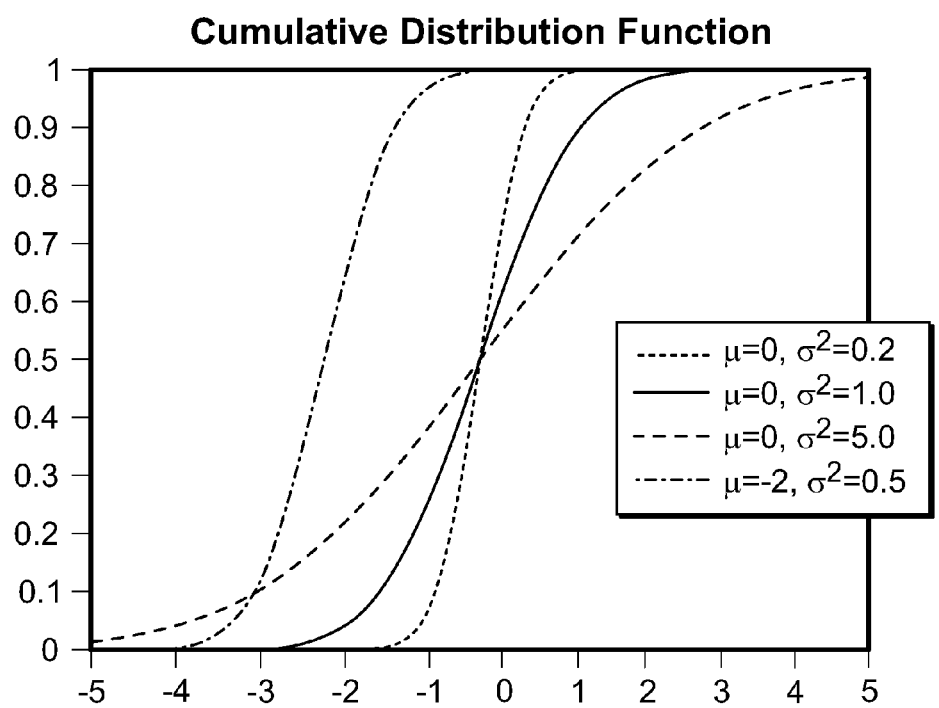

The pdf function P(x) and the cumulative function D(x) for the Gaussian transform are plotted in FIG. 5 and are defined as follows:

$$P(x) = \frac{1}{\sqrt{2\pi}\,\sigma} \exp\left(-\frac{(x-\mu)^2}{2\sigma^2}\right), \quad (5)$$

where $\sigma^2$ is the variance, and $\mu$ is the mean value, $$D(x) = \frac{1}{2}\left(1 + \mathrm{erf}\left(\frac{x-\mu}{\sqrt{2}\,\sigma}\right)\right), \quad (6)$$

where erf( ) is a error function.

The inverse cumulative distribution function for the Gaussian transform, or quantile function, may be expressed in terms of the inverse error function:

$$D^{-1}(f)=\sqrt{2}\,\mathrm{erf}^{-1}(2f-1) \quad (7)$$

Figure 6:
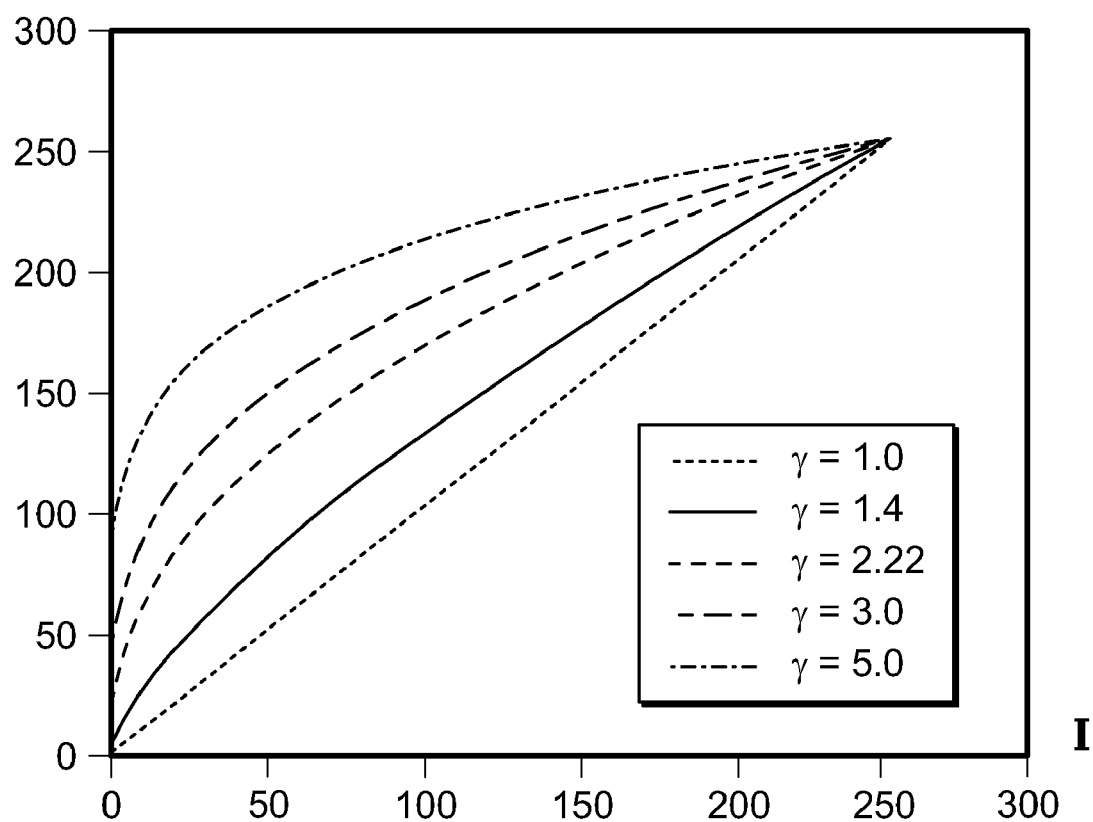
FIG. 6 displays gamma correction curves in terms of different correction indices that may be employed in the pre-processing step of FIG. 1A.

Gamma correction may be used for correcting the nonlinear relationship between pixel value and displayed intensity. Gamma correction I'(x,y) corrects for the nonlinear relationship between the true voltage signals and the display responses. Gamma correction is especially useful when applied to dark scenes. FIG. 6 displays the gamma correction curves in terms of different correction indices. The data range is in [0, 256) in FIG. 6. If the curves in FIG. 6 are compared to the curves for contrast normalization there are some similarities: the small pixel values or energies are boosted up while the large values are suppressed. The general expression for the gamma correction for any bits of data may be expressed in Eq. 8:

$$I'(x, y) = \left(\frac{I(x, y)}{2^p - 1}\right)^{1/\gamma} \cdot I(x, y), \quad (8)$$

where γ is the correction index, and p is the number of bits of the data.

A modified gamma correction formula may be used, known as the ITU-709 HDTV Production standard, to correct an RGB color image. The gamma index is a fixed number γ=2.22. The formula is based on the IPP manual:

Assume R,G,B are normalized in the range of [0,1],

For R,G,B<0.018

R'=4.5 R

G'=4.5 G
B'=4.5 B
For R,G,B>=0.018
R'=1.099 R$^{(1/2.22)}$−0.099
G'=1.099 G$^{(1/2.22)}$−0.099
B'=1.099 B$^{(1/2.22)}$−0.099

Figure 7:
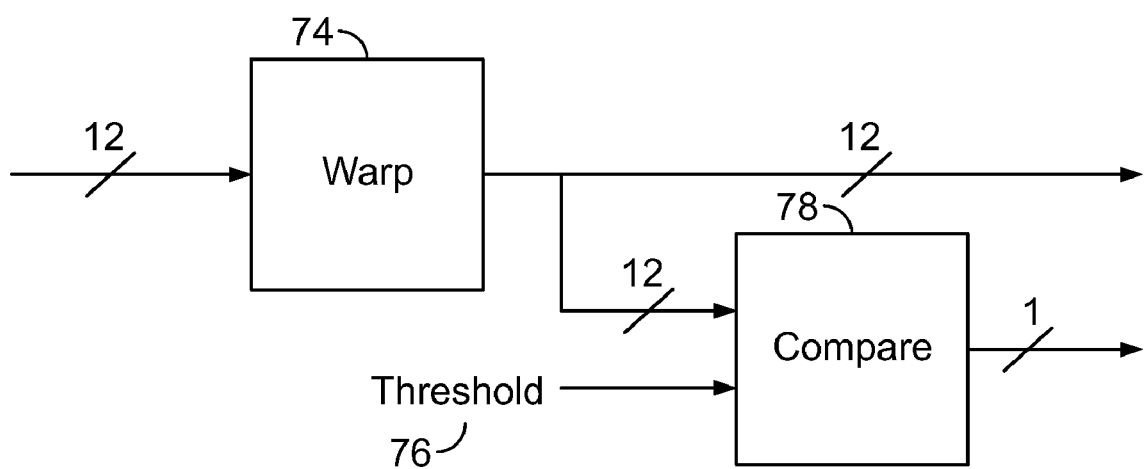
FIG. 7 depicts the steps of image warping and applying a saturation mask to pre-processed image pixel data in the pre-processing step of FIG. 1A.

FIG. 7 depicts the steps of image warping and applying a saturation mask to pre-processed image pixel data is depicted. Assuming 12 bit data, the pixel values are first aligned in the warping block 74 and then compared to a predetermined threshold 76, to generate a 1-bit saturation mask in compare block 78. Warping is implemented using either bi-linear interpolation or bi-cubic interpolation on the k (e.g., 12) bit data. Bi-linear linear interpolation is faster but less accurate than bi-cubic interpolation.

The bi-linear interpolation algorithm uses image values at four pixels $(x_0, y_0), (x_0, y_1), (x_1, y_0), (x_1, y_1)$, which are closest to $(x_s, y_s)$ in the source image:

$$x_1 = x_0 + 1, y_1 = y_0 + 1,$$

$$x_0 \leq x_s \leq x_1, y_0 \leq y_s \leq y_1$$

The pixel value at $(x_s, y_s)$ after bi-linear interpolation may be expressed as follows:

$$I_0 = I(x_0, y_0) \cdot (x_1 - x_s) + I(x_1, y_0) \cdot (x_s - x_0),$$

$$I_1 = I(x_0, y_1) \cdot (x_1 - x_s) + I(x_1, y_1) \cdot (x_s - x_0),$$

$$I(x_s, y_s) = I_0 \cdot (y_1 - y_s) + I_1 \cdot (y_s - y_0) \quad (9)$$

The bi-cubic interpolation algorithm uses image values at sixteen pixels in the neighborhood of the source point $(x_s, y_s)$ in the source image:

$$x_{s1} = x_{s0} + 1, x_{s2} = x_{s0} + 2, x_{s3} = x_{s0} + 3$$

$$y_{s1} = y_{s0} + 1, y_{s2} = y_{s0} + 2, y_{s3} = y_{s0} + 3$$

$$x_{s1} \leq x_s \leq x_{s2}, y_{s1} \leq y_s \leq y_{s2}$$

Figure 8:
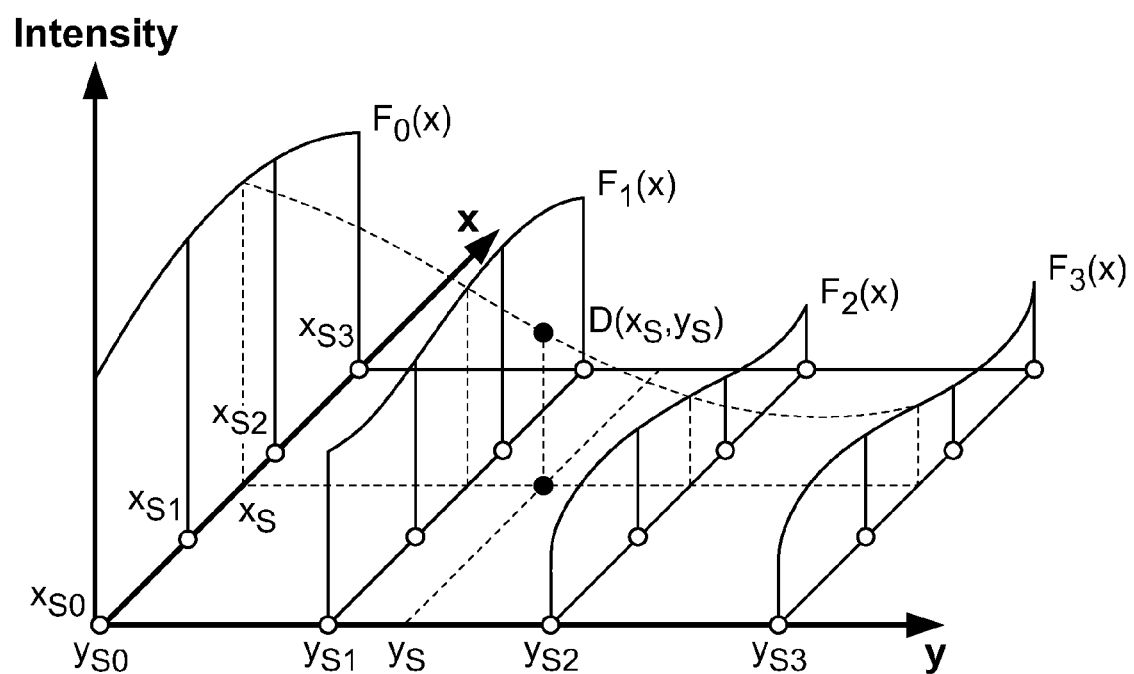
FIG. 8 depicts a bi-cubic interpolation function employed during image warping in the pre-processing step of FIG. 1A.

For each $y_{s1}$, the algorithm determines four cubic polynomials: $F_0(x), F_1(x), F_2(x)$, and $F_3(x)$, each $F_i(x)$ has the following expression:

$$F_i(x) = a_i x^3 + b_i x^2 + c_i x + d_i, 0 \leq i \leq 3, \quad (10)$$

and $I(x_s, y_s)$ is determined by $F_i(x)$. The bi-cubic interpolation function is depicted in FIG. 8.

The saturation mask may be used to get rid of a saturated portion of the image. From experimental data tested on 16-bit pixel values, saturation values may be highly concentrated at the higher bound. After linear stretch, these values may become $2^k - 1$. Therefore, any pixels that are within sat_thr percentage of the k-bit Range may be mask out using a generated saturation mask as follows:

$$\text{mask}(x, y) = \begin{cases} 0, & \text{if } S^W(x, y) < (1.0 - \text{sat\_thr}) * \text{Range} \\ 1, & \text{otherwise} \end{cases} \quad (11)$$

Noise coring at blocks 32 of FIG. 1B is applied to gradient images to remove noise from input (pre-fused) images. Noise levels are generally less than signal levels for the up-to-now processed images. However, if a Laplacian/Gaussian pyramid is generated and a histogram is made of each resulting image, the bulk of the noise resides near locations of about zero energy in the resulting histogram. The bulk of the signal is located generally away from zero energy. Therefore, if the Laplacian/Gaussian pyramid images are filtered near the location of zero energy, then noise may be "cored out" of the image without affecting the main signal. This filtering process is called noise coring.

Figure 9:
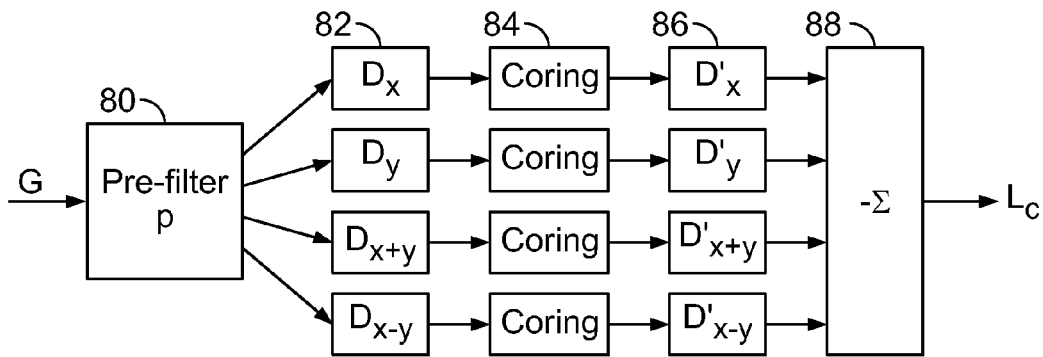
FIG. 9 is a block diagram illustrating the data flow for noise coring on gradient images for level 0.
Figure 10:
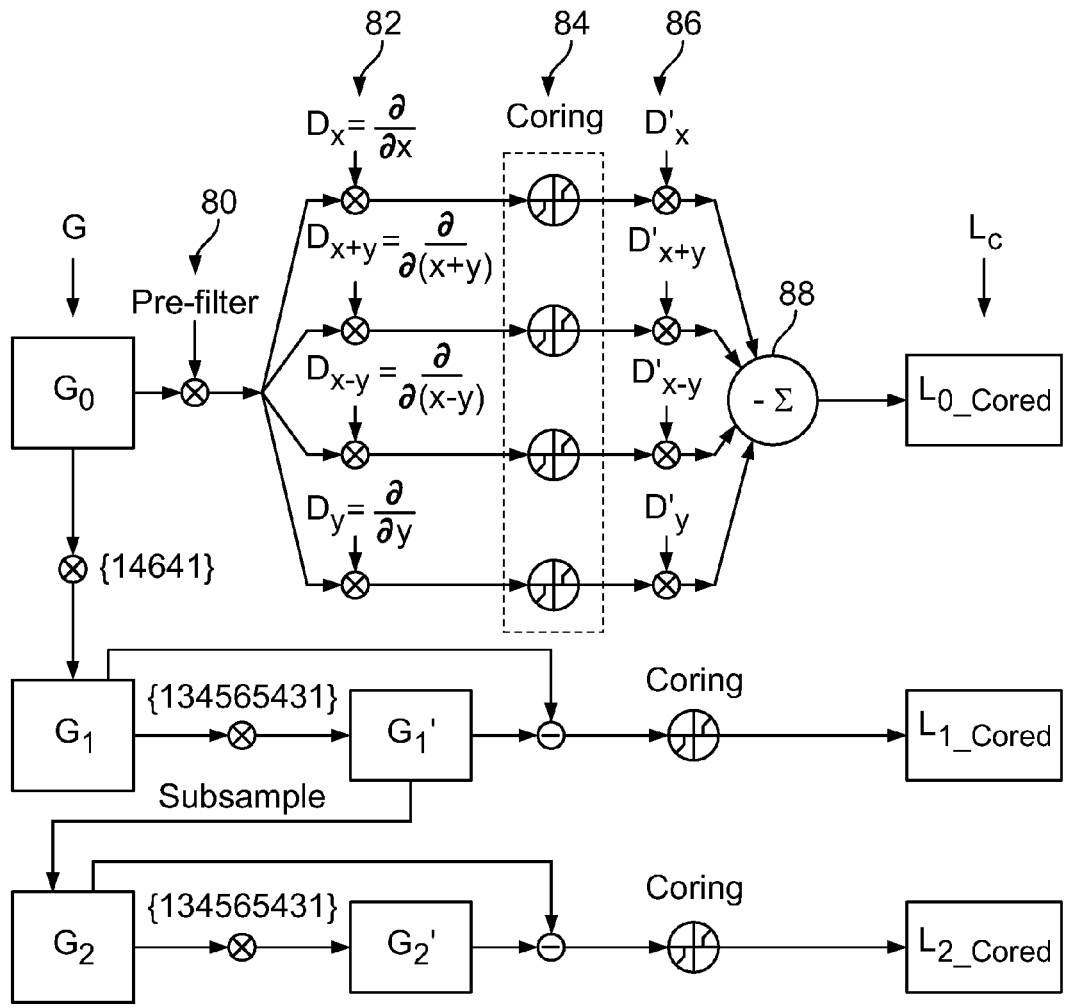
FIG. 10 is a block diagram of a more detailed description of the noise coring process at all levels of a pyramid representation.

The data flow for coring on the gradient images for level 0 is illustrated in FIG. 9. FIG. 10 is a block diagram of a more detailed description of the noise coring process at all levels of a pyramid representation. Noise coring may be applied to Laplacian images at all levels. Noise coring may also be applied to gradient images at all levels. In FIG. 10, the noise coring method is implemented on the gradient images at level 0 and on the Laplacian images at all other levels.

A Gaussian image based on an input image from one of the modalities, G, is filtered by a preprocessing filter 80 and then further processed simultaneously through a plurality of derivative (gradient) filters 82. Then, a noise coring function 84 (to be discussed hereinbelow) is applied to the gradient images. A second set of derivative (gradient) filters 86, which are related to the gradient filters 82 are applied to the cored images. The filtered/cored images are then negatively summed in block 88 to produce an output cored Laplacian image $L_c$.

More specifically, at level 0 and/or 1, when the 5-tap filter w is used, the relation between the Laplacian and Gaussian image is expressed in the following equation:

$$L_0 = (1 - w) \otimes G_0, \quad (12)$$

where w is a 5×5-tap filter:

$$w = \frac{1}{256} \cdot \begin{pmatrix} 1 \\ 4 \\ 6 \\ 4 \\ 1 \end{pmatrix} (1 \; 4 \; 6 \; 4 \; 1) \quad (13)$$

(1−w) may be further decomposed into a summation of a convolution of two derivative filters and one constant pre-filter:

$$1 - w = (1 - w') \otimes (1 + w') = -\frac{1}{8} \cdot \left( \sum_{k=1}^{4} -D_k \otimes D_k \right) \otimes p, \quad (14)$$

where $p, w', D_k$ and $-D_k = D_k'$, (k=x, x+y, y, x−y) are defined as follows:

$$w' = \begin{bmatrix} 1 & 2 & 1 \\ 2 & 4 & 2 \\ 1 & 2 & 1 \end{bmatrix} / 16, \quad (15)$$

$$p = 1 + w' = \begin{bmatrix} 1 & 2 & 1 \\ 2 & 20 & 2 \\ 1 & 2 & 1 \end{bmatrix} / 16, \quad (16)$$

$$D_x = \begin{bmatrix} 0 & -1 & 1 \end{bmatrix}, \quad D_{x+y} = \begin{bmatrix} 0 & 0 & 0 \\ 0 & 0 & 1 \\ 0 & -1 & 0 \end{bmatrix} / \sqrt{2} \quad (17)$$

$$D_y = \begin{bmatrix} 0 \\ 1 \\ -1 \end{bmatrix}, \quad D_{x-y} = \begin{bmatrix} 0 & 0 & 0 \\ 0 & 1 & 0 \\ 0 & 0 & -1 \end{bmatrix} / \sqrt{2}$$

and

-continued $$D'_x = [-1 \quad 1 \quad 0], \quad D'_{x+y} = \begin{bmatrix} 0 & 1 & 0 \\ -1 & 0 & 0 \\ 0 & 0 & 0 \end{bmatrix} / \sqrt{2} \quad (18)$$

$$D'_y = \begin{bmatrix} 1 \\ -1 \\ 0 \end{bmatrix}, \quad D'_{x-y} = \begin{bmatrix} 1 & 0 & 0 \\ 0 & -1 & 0 \\ 0 & 0 & 0 \end{bmatrix} / \sqrt{2}$$

At higher levels, a larger filter for double density pyramid is applied. This filter may be decomposed into a 9-spread-tap filter $w_1$, and a 3-tap binomial filter $w_2$:

$$w = w1 \otimes w2, \quad (19)$$

and $$w_1 = \frac{1}{256} \begin{pmatrix} 1 \\ 0 \\ 4 \\ 0 \\ 6 \\ 0 \\ 4 \\ 0 \\ 1 \end{pmatrix} (1 \; 0 \; 4 \; 0 \; 6 \; 0 \; 4 \; 0 \; 1) \quad (20)$$

$$w_2 = \frac{1}{16} \begin{pmatrix} 1 \\ 2 \\ 1 \end{pmatrix} (1 \; 2 \; 1) \quad (21)$$

w' may be obtained from the root of $w_1$ and $w_2$:

$$w' = \frac{1}{64} \begin{pmatrix} 1 \\ 0 \\ 2 \\ 0 \\ 1 \end{pmatrix} (1 \; 0 \; 2 \; 0 \; 1) \otimes \begin{pmatrix} 1 \\ 1 \end{pmatrix} (1 \; 1) \quad (22)$$

$$= \frac{1}{64} \begin{bmatrix} 1 & 1 & 2 & 2 & 1 & 1 \\ 1 & 1 & 2 & 2 & 1 & 1 \\ 2 & 2 & 4 & 4 & 2 & 2 \\ 2 & 2 & 4 & 4 & 2 & 2 \\ 1 & 1 & 2 & 2 & 1 & 1 \\ 1 & 1 & 2 & 2 & 1 & 1 \end{bmatrix}$$

and $$1 - w = (1 - w') \otimes (1 + w'). \quad (23)$$

Unfortunately, 1−w' may not be decomposed into $$\sum_{k=1}^{4} (-D_k \otimes D_k).$$

Therefore, at a pyramid level at which a double density filter is applied, coring may be applied to the Laplacian image at that level instead of the Gaussian image. More specifically, at level 0, coring is applied to the gradient images. At higher level 1, coring is applied to the Laplacian images only. If level 1 is sub-sampled, and uses [1 4 6 4 1] filter as in level 0, then level 1 may apply the same coring on the gradient images. Filter [1 3 4 5 6 5 4 3 1] is approximated to [1 0 4 0 6 0 4 0 1]⊗[1 2 1].

Two coring functions are considered in the present invention: a hardcore function and a softcore function. The hardcore function is a step function with threshold T, $$I_{out}(i, j) = \begin{cases} 0, & |I_{in}| < T \\ I_{in}(i, j), & |I_{in}| \geq T \end{cases} \quad (24)$$

The softcore is a function of the noise variance $\sigma^2$ and peaking index p:

$$I_{out}(i,j) = (1 - e^{-(I_{in}(i,j)/\sigma)^p}) \cdot I_{in}(i,j) \quad (25)$$

Figure 11:
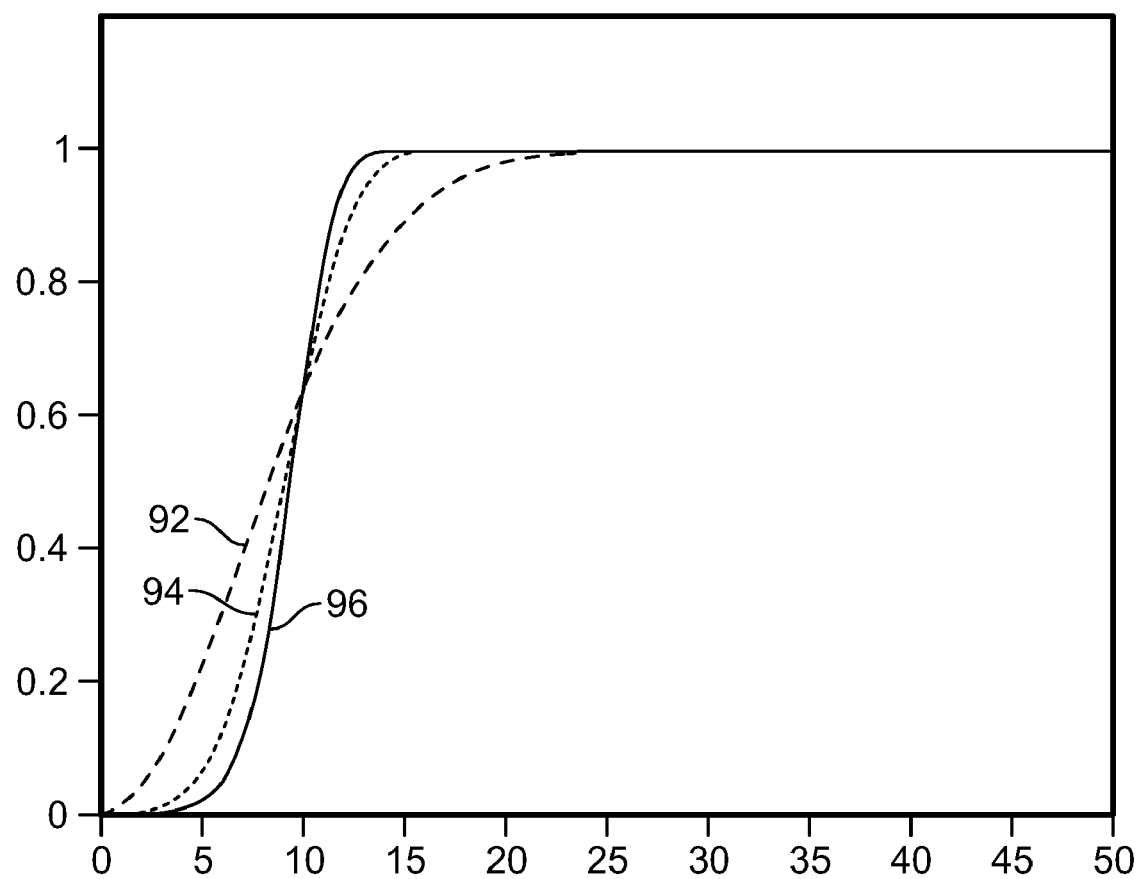
FIG. 11 is a plot illustrating soft coring functions.

By default, p=2. $I_{in}(i,j)$ may be a Laplacian image, or a gradient image. Representative soft coring functions are plotted in FIG. 11 for σ=10.0 and different values of p. For curve 90, p=2; for curve 92, p=4; and for curve 94, p=6. Note that with noise coring, the noise amplitude is reduced by half going from pyramid level n to n+1. Therefore, in a preferred embodiment, only noise at level 0 needs to be "cored."

The present invention takes the Laplacian images at the various levels generated after noise coring to create a modified double-density Laplacian pyramid for each source image before fusion. Sub-sampling is not performed at the highest pyramid level. The image at this level is a quadruple density Gaussian image. Instead of double sampling at level 1, the double sampling at level 2 may be considered in order to reduce the latency. Further, in the preferred embodiment, a simplified 9-tap filter is used to replace a double-step convolution from a combination of a spread-9-tap and a 3-tap filter (which becomes an 11-filter).

In order to handle saturation and blending, a saturation mask pyramid and a ROI mask pyramid are generated for each of the modalities. The decimation of these masks at each level is the same as those from the image pyramid at that level, and so is the filter size. The mask pyramids are 8-bit, and do not require generating Laplacian images. The saturation mask pyramid will be used in the contrast normalization block to blend the enhanced images with the original images in the unmasked region while the ROI mask pyramid is used in the fusion selection process to guarantee proper stitching.

In some embodiments, the cameras have a fixed pose. Once the cameras are calibrated, the overlap among all the images after alignment is a fixed region. This facilitates obtaining the region of interest for each warped image. This region of interest, or ROI, is a function of the alignment parameters, the NUC coefficients and the image properties (e.g., black borders, static overlay, etc). Since camera information is lacking, the ROI may be generated from the alignment parameters.

Figure 12:
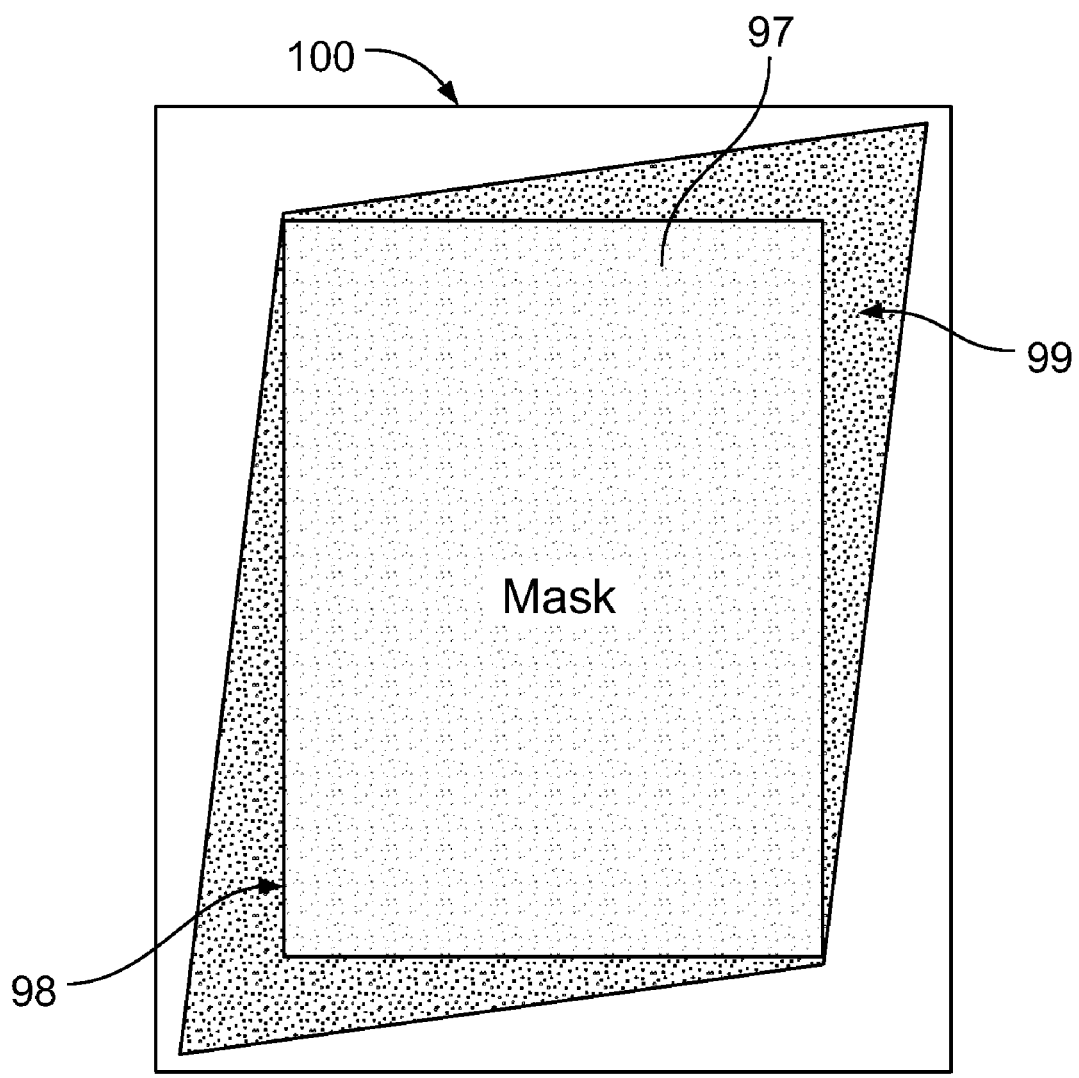
FIG. 12 is a diagram illustrating how an ROI mask is computed from the computed ROI of a warped image.

Referring now to FIG. 12, the ROI mask 97 is computed from the computed ROI 98 of the warped image 99. The computed ROI 98 is based on the alignment parameters. The ROI 97 is bound by the reference image space 100, and is the maximum rectangle fit into the warped image 99. The unmasked region at level 0 is set to $2^p-1$, while the masked region is set to 0. The mask border will blur when it is filtered and sub-sampled to the higher pyramid level. The unmasked area is a subset of the ROI. The two corners $(x_0, y_0)$ and $(x_b, y_b)$ are computed as follows:

offset = 8;
shift = 3;

```
xo = ((roi.xo + offset)>>shift) << shift;
    yo = ((roi->yo + offset)>>shift) << shift;
    xb = (((roi->xb - offset)>>shift) << shift) -1;
    yb = (((roi->yb - offset)>>shift) << shift) -1;
    w = xb - xo + 1;
h = yb - yo + 1;
```

In order to improve fusion, source images of each of the modalities need to be normalized before a selection step is performed at each level. Generally speaking, it is desirable to selectively diminish large, high frequency steps while greatly augmenting small, high frequency details. In a preferred embodiment, the present invention employs a pyramid technique called contrast normalization, which is fit into a generic pyramid fusion structure, and which uses different transfer functions to re-map values for each level of the pyramid. The concept of contrast normalization will be discussed hereinbelow. Afterward, the use of contrast normalization in the context of the present invention is discussed.

Figure 13:
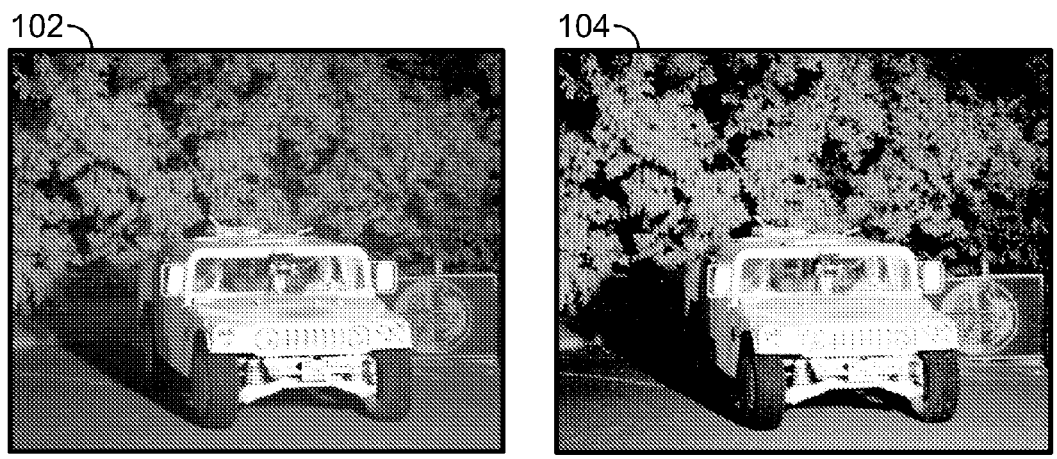
FIG. 13 displays before and after photographs of an image when subjected to contrast normalization.

Salient features appear very different when present in brightly lit regions of a scene than when in heavily shadowed regions. Relatively lower contrast features may be masked by nearby high contrast features. Contrast normalization seeks to reduce the overall dynamic range of an image while adjusting the contrast of local features towards an optimal level that is sufficient for detection yet not so high as to mask other nearby features. The effects of contrast normalization on images are depicted in the images of FIG. 13. The panels 102, 104 are based on a 12 bit SWIR image obtained at night. The left panel 102 shows this image windowed and scaled to 8 bits. The right panel 104 shows contrast normalization. Note that bright regions have been darkened while dark areas have been lightened. Within these regions the contrast of low contrast features, such as the leaves, has been increased, while that of high contrast features, such as the vehicle, has been decreased. These adjustments have allowed much more pattern information to be shown within the fixed dynamic range of the displayed image. In contrast normalization, local pattern structure is adjusted to optimize contrast for visibility and analysis.

Contrast may be defined roughly as the difference between the maximum and minimum image intensity values within the a local neighborhood, divided by the dynamic range of the image itself. Relevant pattern structure occurs at many scales within an image, with small scale details features, such as edges and texture, superimposed on larger scale features, such as gradations in illumination and shadow. For these reasons, the normalization process needs to be implemented within a multi-resolution transform domain, such as by employing Laplacian pyramids. In some embodiments, other multi-resolution transforms could be used.

Figure 14:
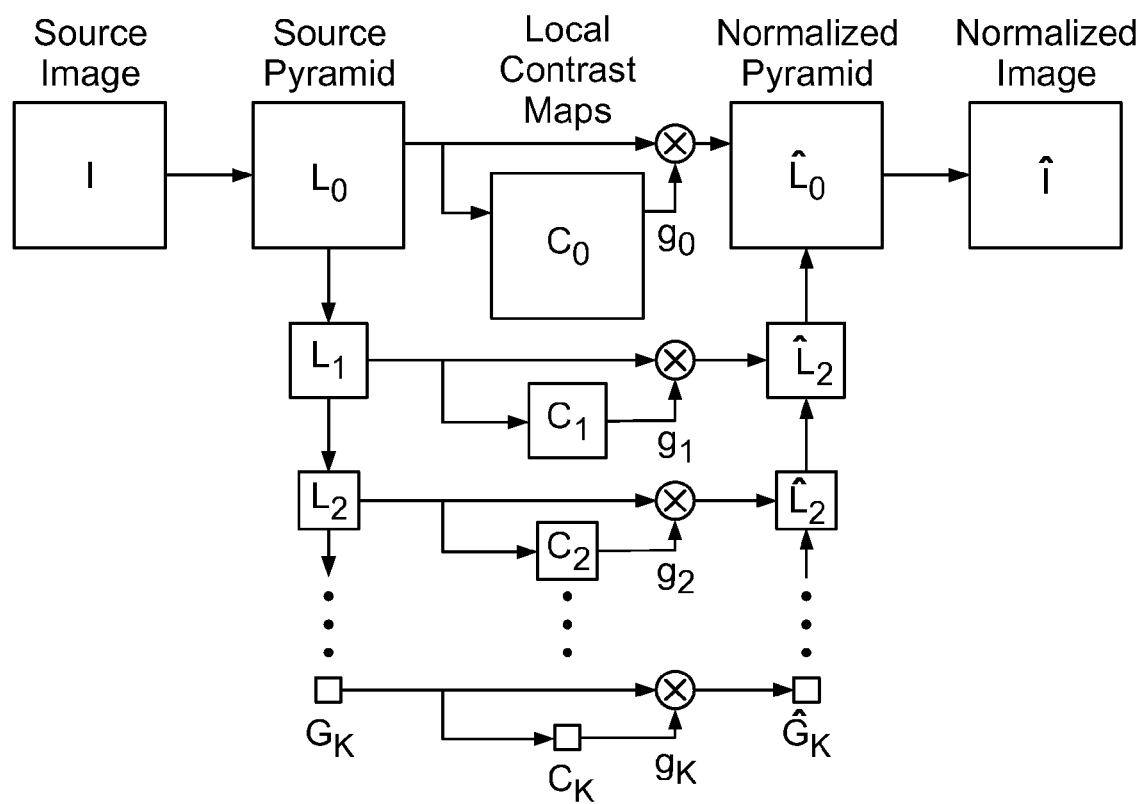
FIG. 14 is a block diagram illustrating the general framework of contrast normalization.

FIG. 14 suggests a general framework for contrast normalization. The source image, I, is first transformed into its Laplacian pyramid, L. A local contrast map, C, (image energy map) is computed for each Laplacian level. The Laplacian values are then adjusted by a gain function, g, to form a contrast normalized Laplacian, $\hat{L}$. Finally the contrast normalized image, $\hat{I}$, is obtained from $\hat{L}$ through an inverse Laplacian transform. The gain function at each level is based on the corresponding local contrast map and a defined "target" contrast value, T, such that the gain is larger than 1 where local contrast is below the target contrast, and smaller than 1 where it is above the target.

In the present invention, the filter-subtract-decimate (FSD) Laplacian pyramid transform is used and may be defined briefly as follows. Let I(ij) be the source image. Let $G_k(ij)$ be a K+1 level Gaussian pyramid based on I(ij), with k=0 to K. Let $L_k(ij)$ be the corresponding Laplacian pyramid, for k=0 to K-1. The Gaussian is generated through a recursive filter and subsample process: $G_0$=I, and for k=1 to K $$G_k = [w * G_{k-1}]_{\downarrow 2}. \quad (26)$$

Here the symbol $\downarrow 2$ means the image in brackets is subsampled by 2 in each image dimension. The generating kernel, w, is a small low-pass filter. In the present invention a 5 by 5 separable filter with binomial weights is used:

$$w = \begin{bmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{bmatrix} \frac{1}{256}. \quad (27)$$

Each level of the Laplacian pyramid is obtained by applying a band pass filter to the corresponding Gaussian:

$$L_k = G_k - w * G_k. \quad (28)$$

The original image may be recovered from its Laplacian transform by reversing these steps. This begins with the lowest resolution level of the Gaussian, $G_K$, then uses the Laplacian pyramid levels to recursively recover the higher resolution Gaussian levels and the original image. For k=K-1 to 0, $$G_k \approx (1+w) * L_k + 4w * [G_{k+1}]_{\uparrow 2}. \quad (29)$$

The symbol $\uparrow 2$ means upsample by 2. The expansion filter 1+w is an approximation used here as suitable for contrast normalization. The recovered image is then just I=$G_0$.

The Laplacian pyramid effectively decomposes the original image into a set of octave wide bandpass components that differ in center frequency, or scale, by factors of 2. In contrast normalization, the values that occur within each band are adjusted so that they approach the specified target contrast value. A local contrast for a band pass signal is defined as the local RMS (root mean square) value within a window W divided by the image dynamic range. A contrast map is defined in this way for each Laplacian pyramid level:

$$C_k = \frac{1}{R}(W * L_k^2)^{1/2}. \quad (30)$$

Here $R=2^N$ is the dynamic range of the original N bit image. In Li and Adelson et al., "*Compressing and Companding High Dynamic Range Images with Subband Architectures*," Massachusetts Institute of Technology, Cambridge, Mass., Li and Adelson et al. have found that the least window size should be the filter size used for pyramid generation. This would greatly reduce the signal distortion since the local gain factor is based on the energy value from the local contrast map ($C_k$). The window size picked is twice the size of the filter in a software simulation, W=2w, but equal size in a hardware implementation after considering limiting the latency in the fusion system, W=w. Sub-sampling within the pyramid means that the effective size of the window doubles from level to level.

In contrast normalization, the sample values of the source pyramid L are adjusted to form a normalized pyramid $\hat{L}$ in which the local contrast is shifted towards the specified target level T. In general, T differs from level to level. Let $T_k$ be the target contrast at pyramid level $L_k$. Normalization is achieved through multiplication by a gain factor, g, which is a function both of the local contrast and the target contrast:

$$\hat{L}_k(ij) = g(C_k(ij), T_k) L_k(ij). \qquad (31)$$

The gain function is compressive toward T, so that Laplacian sample values will be increased where $C_k(ij) < T_k$ and decreased where $C_k(ij) > T_k(ij)$. More specifically, a gamma exponential function is adopted to achieve this result:

$$g(ij) = \left( \frac{T_k(1+\varepsilon)}{C_k(ij) + T_k \varepsilon} \right)^{1-\gamma}. \qquad (32)$$

Figure 15:
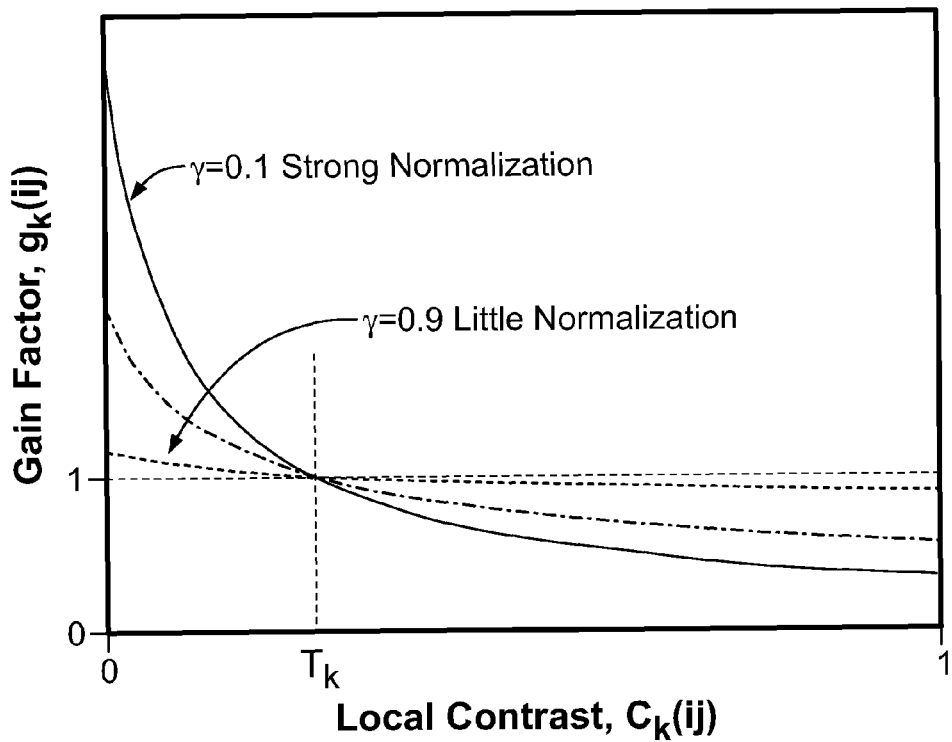
FIG. 15 is a plot showing the gain function of contrast normalization for various values of contrast index $\gamma$.

Here $\varepsilon$ serves to limit the gain when the contrast is very small, $\varepsilon T_k$ is comparable to the amplitude of image noise. The exponent, $\gamma$, controls the degree of normalization. $\gamma$ varies between 0 and 1 with values near 0 corresponding to a high degree of normalization and values near 1 corresponding to little normalization. These relationships are show in FIG. 15.

In general it is expedient to reduce the contrast of lower frequency components of an image relative to higher frequency components. High frequencies often represent the pattern detail important to object recognition, while low frequency often represents gradations in illumination or larger scale objects in the scene. In a preferred embodiment, a simple scaling rule is adopted in which the target contrast in reduced by a factor $\beta$, from level to level:

$$T_k = \beta^k T_0. \qquad (33)$$

Figure 16:
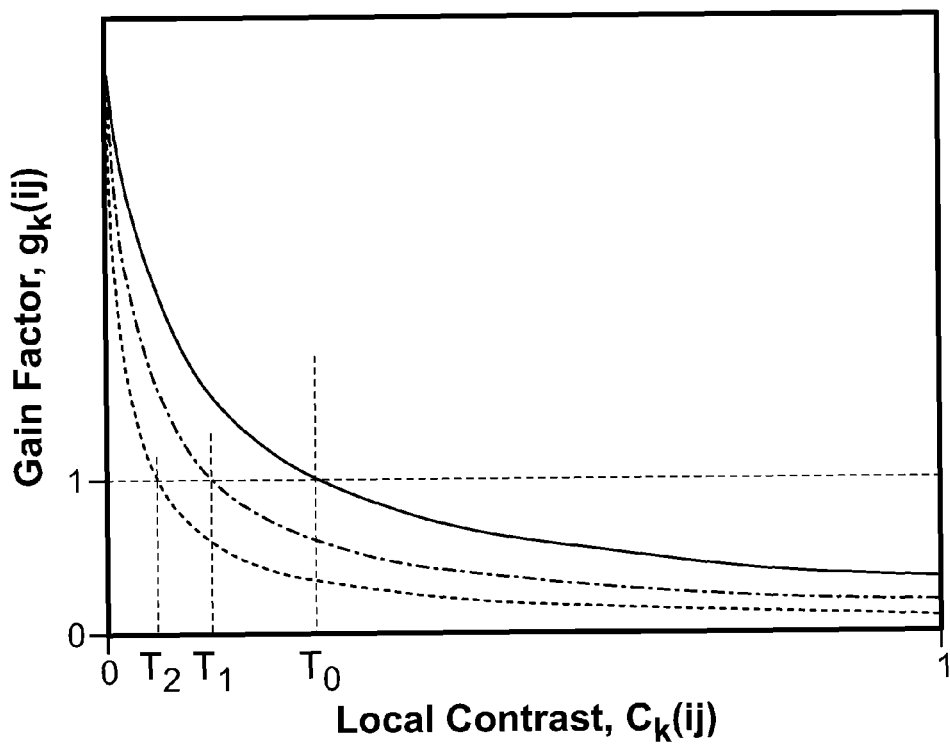
FIG. 16 is a plot illustrating the gain function of contrast normalization at successive pyramid levels.

$\beta$ is a constant, $0 < \beta \leq 1$. Larger values of $\beta$ within this range result in uniform contrast across levels, while smaller values result in reduced contrast of low frequency components relative to higher frequencies. Gain functions for successive pyramid levels and $\beta = 1/2$ are shown in FIG. 16.

Figure 17:
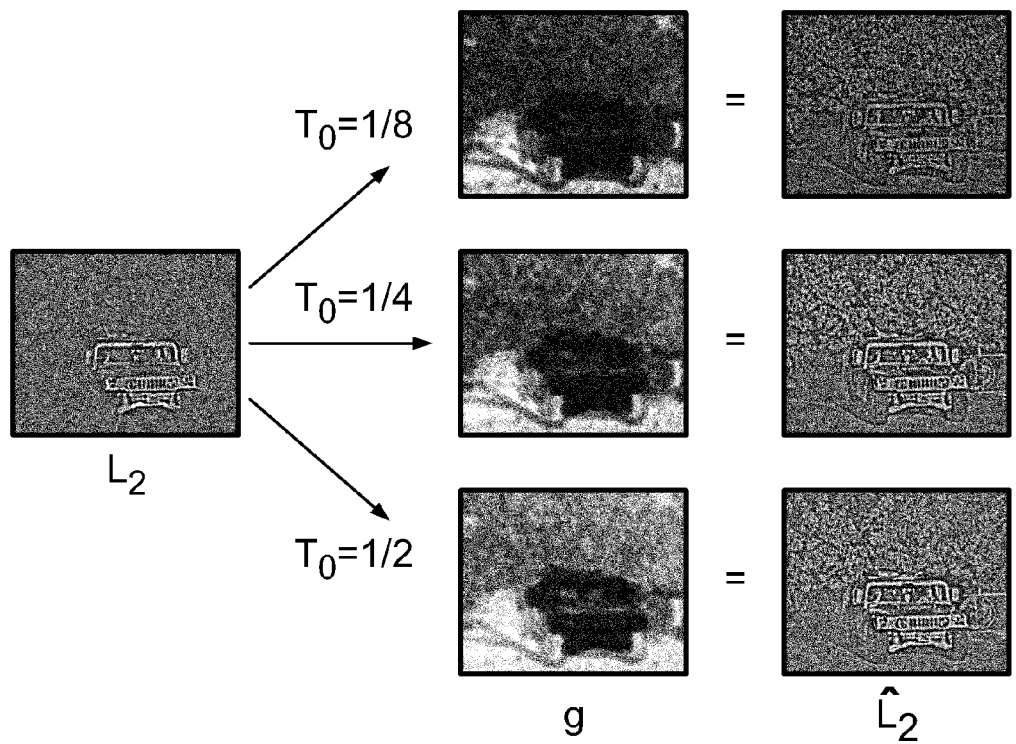
FIG. 17 illustrates a plurality of images that show the effects of varying the target contrast $T_0$ in contrast normalization.

The target contrast parameter, $T_0$, determines how strong feature contrast is in each level of the normalized pyramid, and in the final normalized image. The role of $T_0$ is illustrated in FIG. 17, which is normalized by the dynamic range of the image. FIG. 17 shows Laplacian level 2 of the SWIR HWMMV example introduced in FIG. 13. The source, $L_2$, is shown on the left. Normalized results, $\hat{L}_2$, are shown on the right for three values of $T_0$. (In this case $\beta = 1/2$, so $T_2 = T_0/4$. $\gamma = 0.1$ in all cases.) Note that gain is greatest, and features appear with most contrast after normalization, when the target contrast is largest, $T_0 = 1/2$. Note also that gain in each case is greatest in the background region of the image, which has the lowest contrast in the original. After normalization, the contrast of the background features approaches that of the vehicle.

Figure 18:
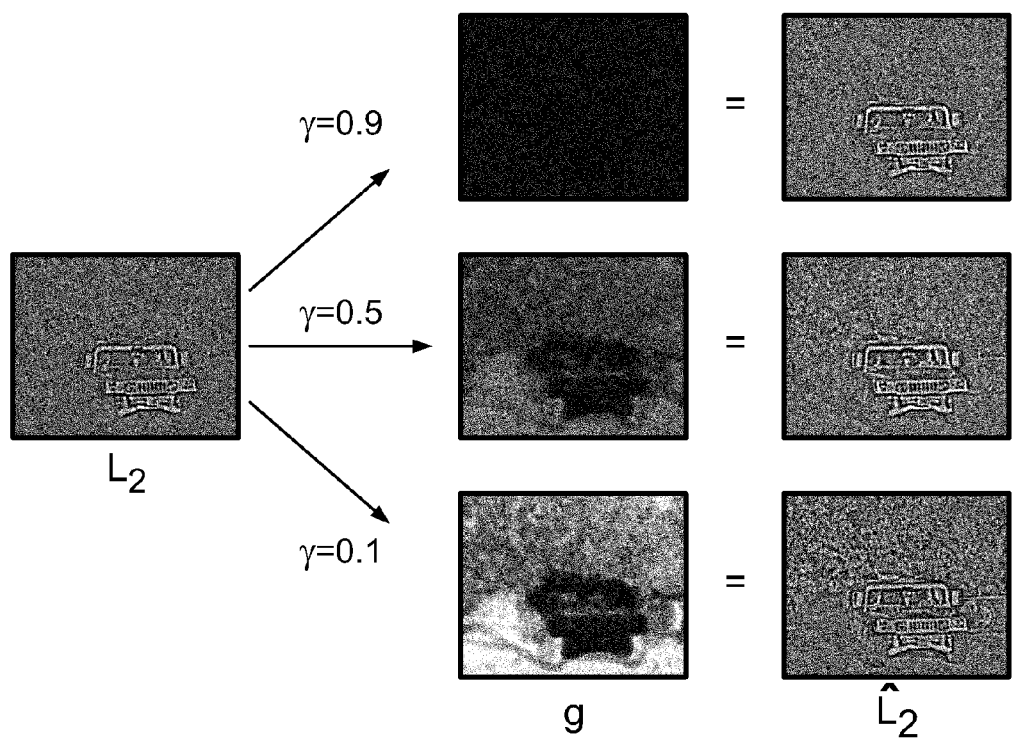
FIG. 18 illustrates a plurality of images that show the effects of varying contrast index $\gamma$ in contrast normalization.

The exponent, $\gamma$, determines the degree of normalization. When $\gamma$ is near 1 there is little change in Laplacian values. When $\gamma$ is near 0 local feature contrast is forced to closely approach the target across the image. These effects are shown in FIG. 18. This includes three examples that differ in $\gamma$. In all cases $T_0 = 1/2$ and $\beta = 1/2$. Note that for $\gamma = 0.9$ there is little change in the Laplacian, and that the vehicle remains the prominent region of the image. For $\gamma = 0.1$, on the other hand, all regions of the image are adjusted to have nearly the same, relatively high contrast.

In the context of the present invention, the gain function, g(ij) is set according to specific requirements to be outlined hereinbelow. Further, the normalized images $\hat{L}_k(ij)$ of Equation 31 are not recombined immediately into one Laplacian image after applying gain, but instead undergo image fusion steps for each of the modalities to be discussed hereinafter.

Figure 19:
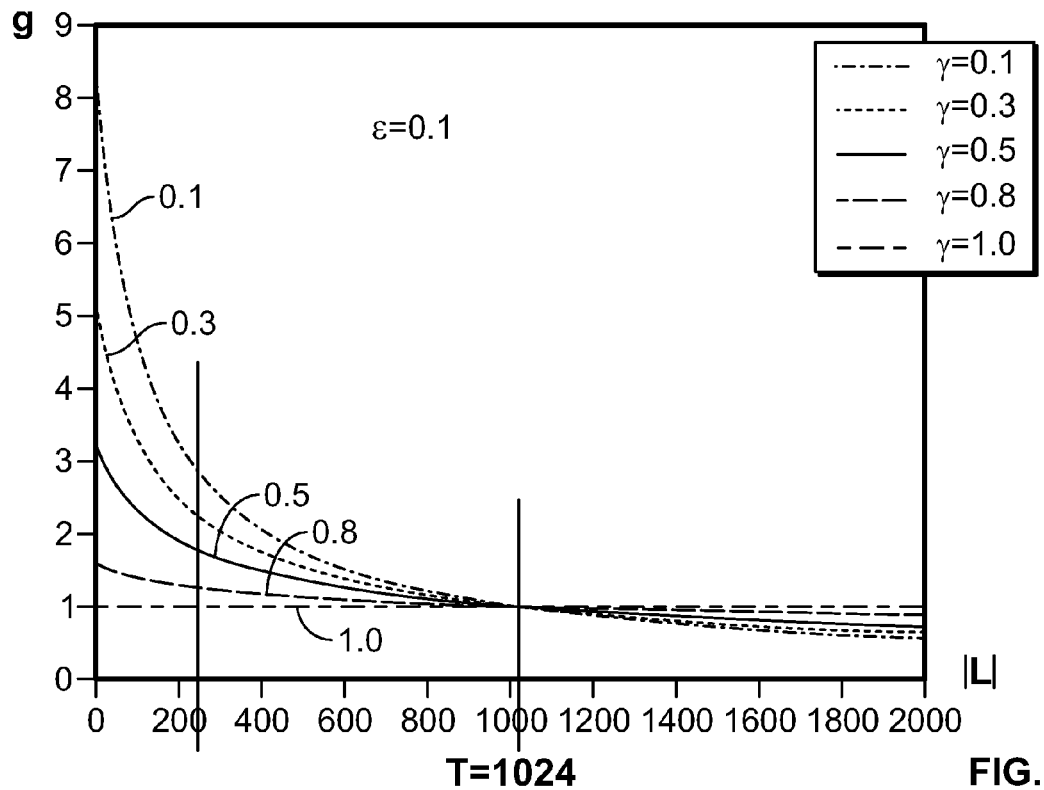
FIG. 19 is a plot of a series of contrast normalized gain functions that indicate a boost of energy below the contrast target (T) and a decrease of energy beyond T.
Figure 20:
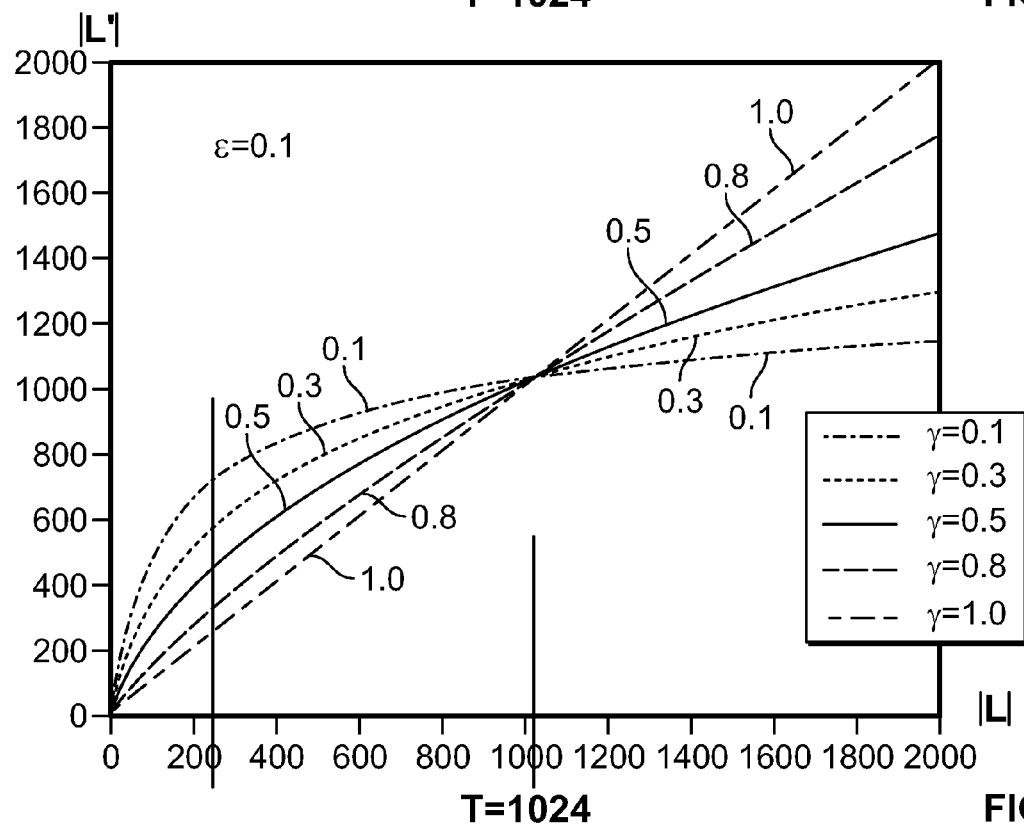
FIG. 20 is a plot of mapping functions for corresponding gain functions in contrast normalization specified in FIG. 19.

FIG. 19 re-plots the gain function versus |L| for T=1024, $\varepsilon = 0.1$ for different values of $\gamma$ corresponding as series of normalized functions that indicate the boost of energy below the contrast target (T) and the decrease of energy beyond T. FIG. 19 also shows that the smaller the power index ($\gamma$) is, the higher the gain at small energy. The maximum gain ($1/\varepsilon$) is obtained at $\gamma = 0$. The corresponding mapping function for the corresponding gain functions specified in FIG. 19 of $|\hat{L}|$ to $|L|$ is plotted in FIG. 20. In FIG. 20, it is clear to see that values in the range of [0,T) are boosted, and suppressed when they are larger than T. Based on this gain function, a rule is defined that uses different parameters for each pyramid level:

Given $\varepsilon_0$, $\gamma_0$, and $T_0$ at level 0,

For $0 < n < $max_lev, $\varepsilon_n = \varepsilon_{n-1}, \gamma_n = \gamma_{n-1},$ and $T_n = T_{n-1}/2$.

Figure 21:
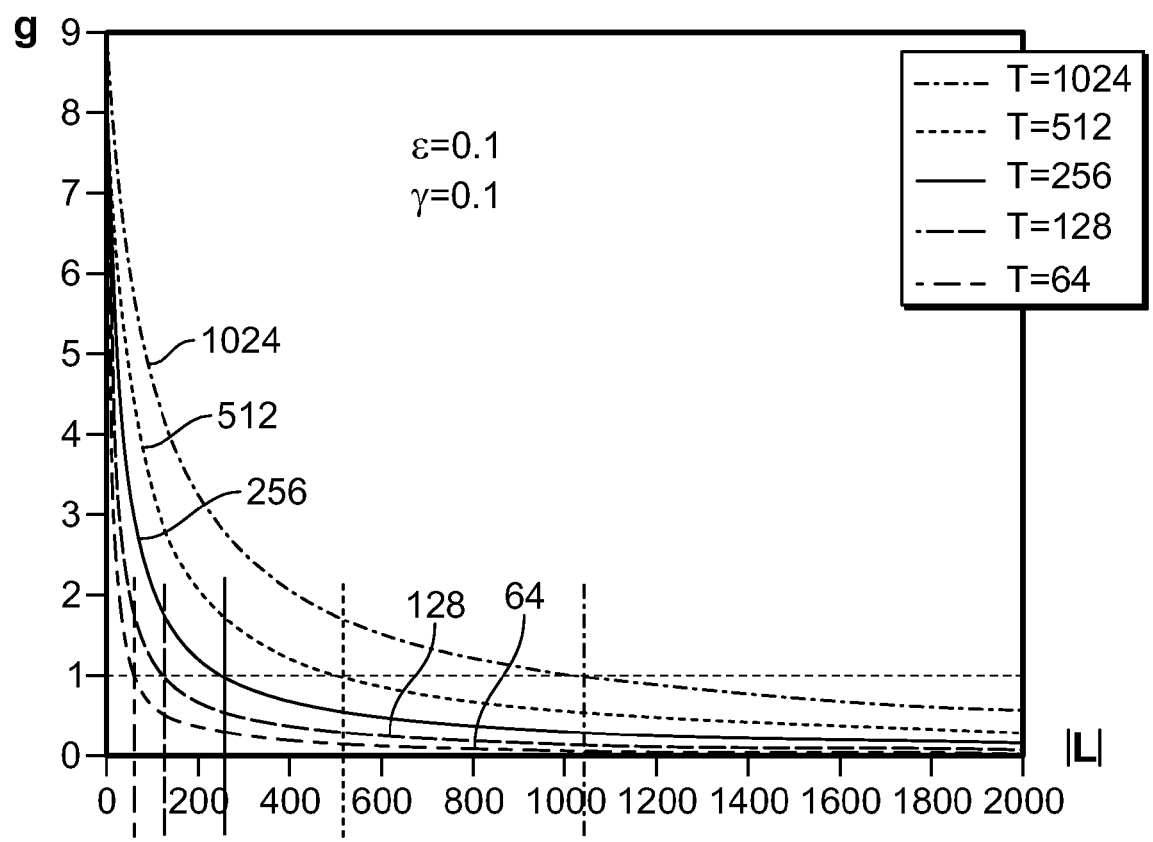
FIG. 21 is a plot of gain functions for all pyramid levels in contrast normalization wherein $\epsilon$ and $\gamma$ are held constant and the target contrast T is reduced by half as it progresses to higher levels in a pyramid.
Figure 22:
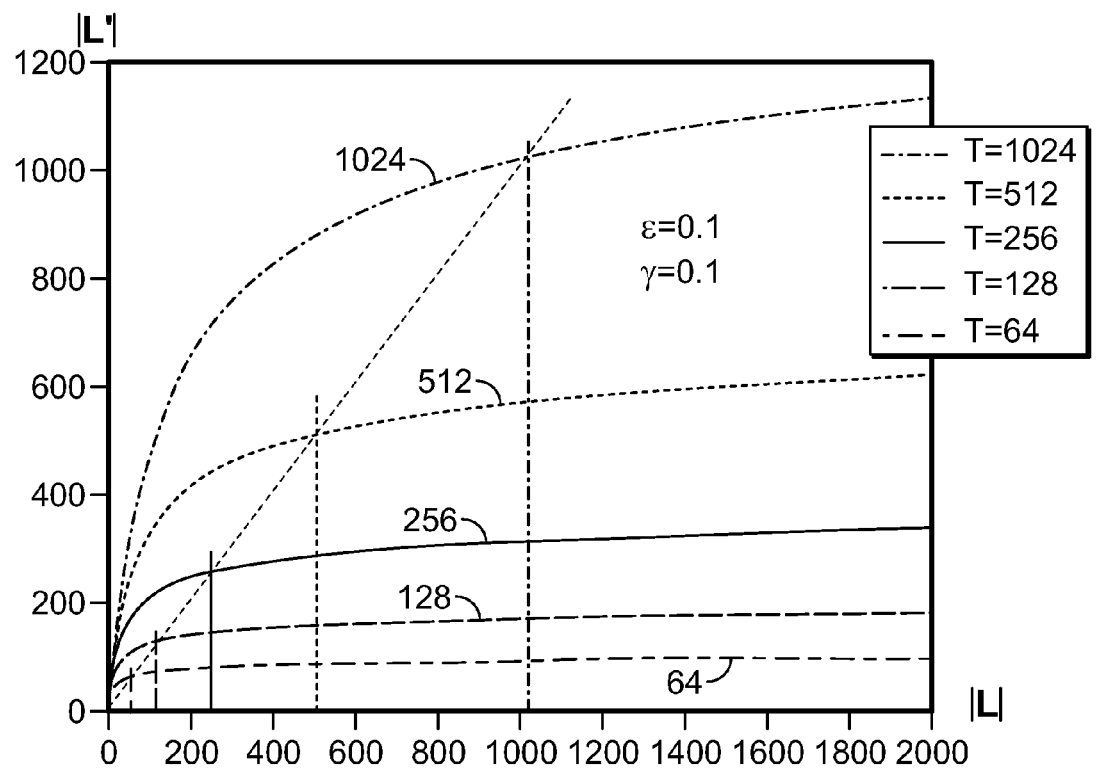
FIG. 22 is a plot of mapping functions for the corresponding gain functions in contrast normalization specified in FIG. 21.

FIG. 21 shows the gain functions at each pyramid level. $\varepsilon$ and $\gamma$ are kept the same at all levels, T is changed by half when it goes to the next level. There are two unique features of this method that worth discussing. First, in each Laplacian image, the small signals are boosted, and the large signals are suppressed. This enhances the weak details that are hardly seen in a linear stretch. Second, generally speaking, the average value of the absolute Laplacian image increases when the pyramid level is higher. The lower level Laplacian image contains more high frequency information. The contrast normalization rule in the pyramid tends to reduce more in higher-level Laplacians, which equivalently reduces the low frequency signals, and thus locally sharpens the image. The mapping function in FIG. 22 indicates the difference when T is differed by a power of 2 in each level. The mapped result from the same input value decreases significantly from level 0 to level 4.

Since small energy values are boosted in the gain function, noise at each level, which is usually much smaller, is boosted as well with high gain. In order to reduce noise while keeping the signals boosted, Eq. 25 may be combined with the gain function of Eq. 32. The expression of the gain function is thus written as:

$$g(x, y) = g_0 \cdot \left(1 - e^{-(E(x,y)/\sigma)^p}\right) \cdot \left( \frac{T \cdot (1+\varepsilon)}{E(x, y) + T \cdot \varepsilon} \right)^{1-\gamma}, \qquad (34)$$

where E(x,y) are the local energy map values of an image after block 110, and is the local contrast map values $C_k(ij)$ in Eq. 32. The image may be enhanced further by means of noise coring. Noise may be reduced in higher level images. The parameter a representing noise used in the coring formula is related to the pyramid level as follows:

Given $\sigma_0$, at level 0,

For $0 < n < $max_lev, $\sigma_n = \sigma_{n-1}/2$.

Figure 23:
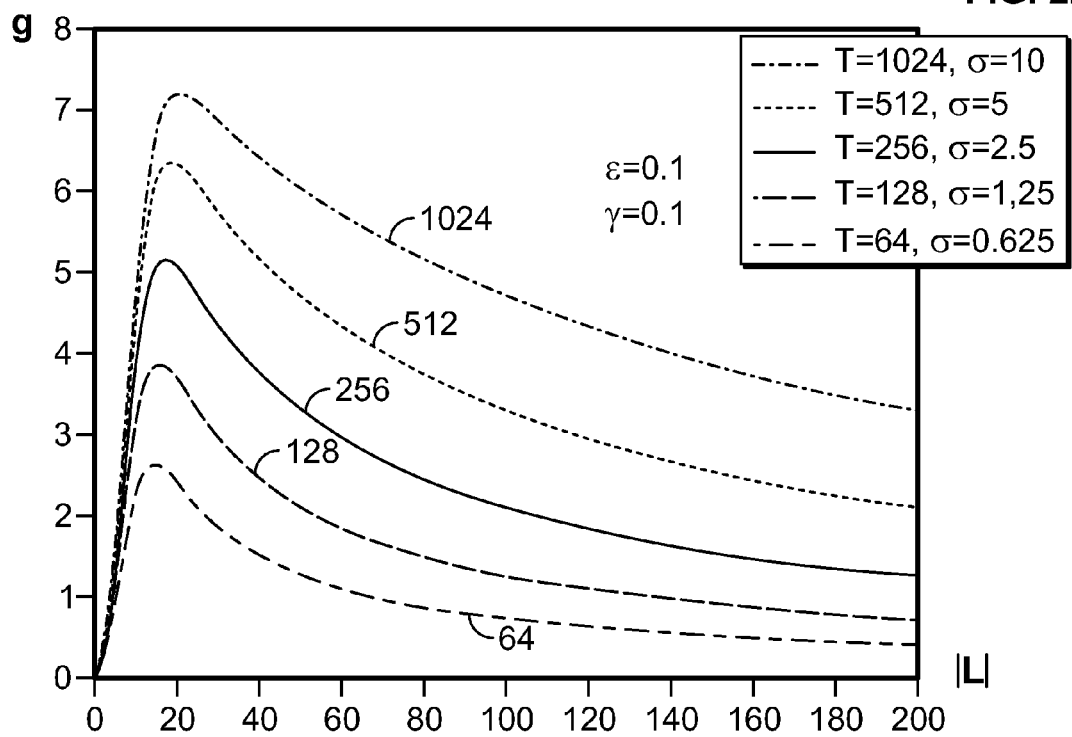
FIG. 23 is a plot of gain functions with noise coring in contrast normalization for all pyramid levels.

The gain function with coring is plotted in FIG. 23. If noise coring is done in the gradient images at a level, then noise coring should not be applied to that level in the Laplacian image.

Figure 24:
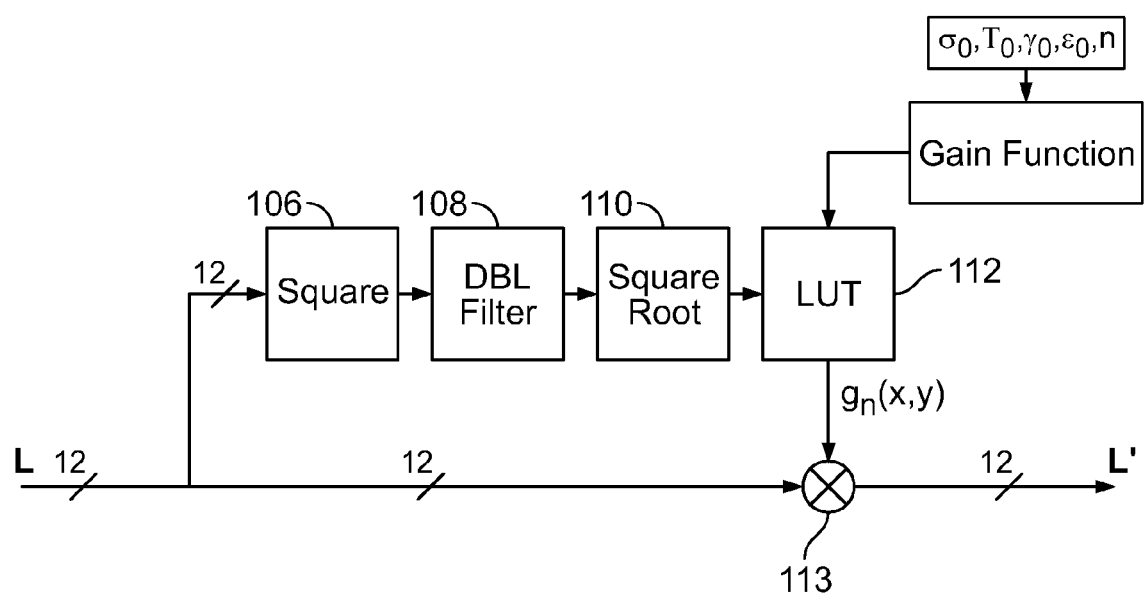
FIG. 24 is a block diagram illustrating the steps of contrast normalization as it is employed in the present invention.

FIG. 24 depicts a block diagram depicting how contrast normalization of the Laplacian pyramid is effected on each of the modalities in a preferred embodiment of the present invention. If noise coring is not implemented, then a Laplacian pyramid needs to first be generated from the images of different modalities after optional preprocessing; otherwise, the Laplacian images and top level Gaussian images produced by the noise coring step are used directly for contrast normalization. At each level, at block 106, the image values are squared. At block 108, they are passed through a "double size" filter, i.e., a filter that has dimensions which are double the size of the dimension of the filter used for pyramid generation (without which distortion is introduced) and then at block 110, the square root is taken. This gives an energy image of the Laplacian image. At block 112, a contrast normalization gain is found by means of a look up table (LUT) which is based on the energy and the gain function shown in FIG. 19 which is in turn based on the initial values of parameters $\sigma_0$, $T_0$, $\gamma_0$, $\epsilon_0$, n and Eq. 32. The LUT needs to be updated (in a computer memory) only when any of the input parameters $\sigma_0$, $T_0$, $\gamma_0$, $\epsilon_0$, n change, which is user updatable. Since $\sigma_0$ may depend on the camera shutter speed and $T_0$, $\epsilon_0$ depend on image context, a user has one button to adjust: the contrast $\gamma_0$, hence the fusion process is fully adaptive. At block 113, the input Laplacian image L is multiplied by the contrast normalization gain to produce the normalized Laplacian image L'.

In the present invention, the process of constructing a pyramid of images from a source image is to employ the noise cored images at all scales except for the smallest scale. For all scales except the lowest, the contrast normalization algorithm depicted in FIG. 24 is employed. At the smallest scale, contrast normalization applies to the Gaussian image first, then the average value of the Gaussian image is computed. The Gaussian image thus may be regarded as a signed image offset by the average value. The average of the signed image is 0. The offset value is adjustable, such that the reconstructed image may be turned brighter or darker. Contrast normalization applies to the Gaussian image as expressed in Equations 35(a):

$$G'_n(x,y) = CN(G_n(x,y)), \quad (35)$$

$$G''_n(x,y) = \alpha(G'_n(x,y) - \overline{G}'_n) + \text{offset}, \quad (35a)$$

The contrast normalization setting of this image uses the same rules as the Laplacian images, except that the contrast target is set to be the maximum value of the Gaussian image. The offset is set to the middle of the data range $(2^{n-1})$ by default. If the offset is set to be the average of the image, then there is no change in the brightness When considering saturation mask, it is assumed that the masked region should be untouched, thus the gain is 1.0. To avoid the sharp change at the mask borders, a blending mechanism is used to transit from the masked region to the unmasked region as expressed in Equation 36:

$$g'(x,y) = \frac{(2^p - 1 - \text{mask}_s(x,y)) \cdot g(x,y) + \text{mask}_s(x,y) \cdot 1.0}{2^p - 1}, \quad (36)$$

where g(x,y) is the contrast normalization gain function. The level 0 mask has the binary values: 0 and $2^p-1$, and p=8: Other masks of higher levels will have a blurred border because of the filters that are applied to them. In embodiments in which the saturation mask is used, the contrast normalization block in FIG. 24 needs to be updated such that the LUT is generated based on Eq. (36) instead of Eq. (34).

The present invention fuses the Laplacian images and the top level Gaussian image from each of the modalities using different methods. For the Laplacian images, salience selection fusion, to be described hereinafter, is employed. The salience selection fusion technique of the present invention, which is based on a localized correlation measure, effectively reduces aliasing in the fused image. In order to reduce the flicker problem when values from different source Laplacians at the same location have equal amplitudes but opposite signs, a hysteresis function is applied during the application of a selection mask to be described hereinbelow. Salience selection fusion reduces aliasing in the spatial domain, and hysteresis reduces flickers in the temporal domain. To reduce border effects from several source images in fusion, the ROI mask described above is introduced in the selection process.

In a preferred embodiment of the present invention, the winner among a plurality of images to be fused is not solely based on the amplitude or energy of a Laplacian pixel at (x,y) (better known as feature-selective fusion), but on a localized correlation measure (or salience measure) around (x,y). The energy of each pixel in a given Laplacian pyramid image is averaged with its surrounding neighbors. Then each source Laplacian is associated with a selection mask. This binary mask set its value at (x,y) to $2^p-1$ (p=8) if its salience measure is the maximum in amplitude compared to the other source images at the same location, otherwise, it is set to 0. The selection mask may be set to other different values if and only if 1) ROI mask is used 2) more than one source share the same maximum amplitude at (x,y). To further reduce the aliasing, selection masks are again filtered and used as a weight factor for the fused Laplacians.

Figure 25:
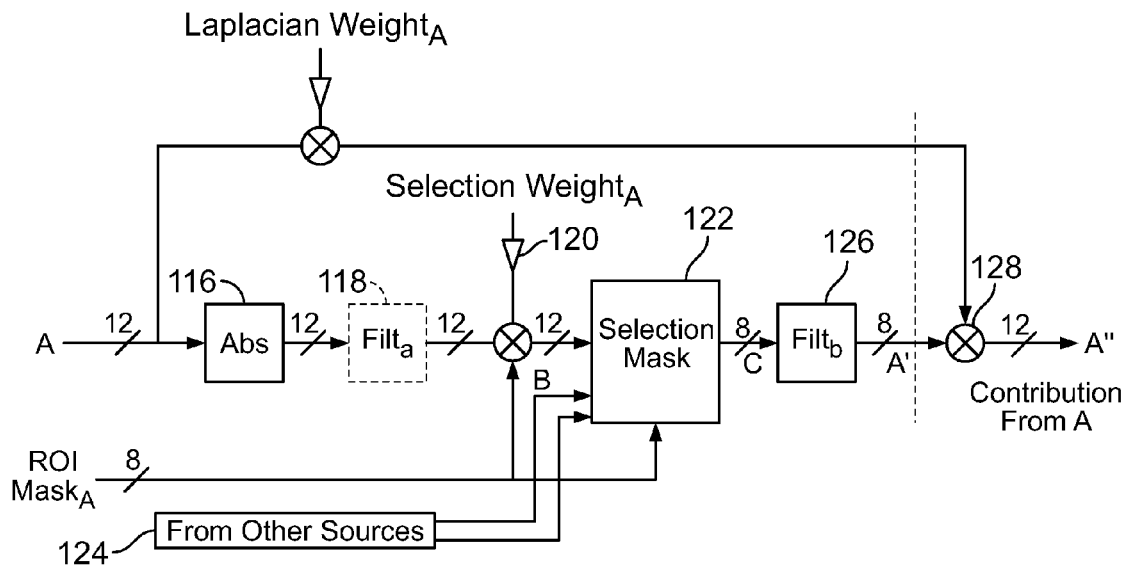
FIG. 25 is a block diagram illustrating the steps of salience selective fusion for the contribution of a single source modality.
Figure 26:
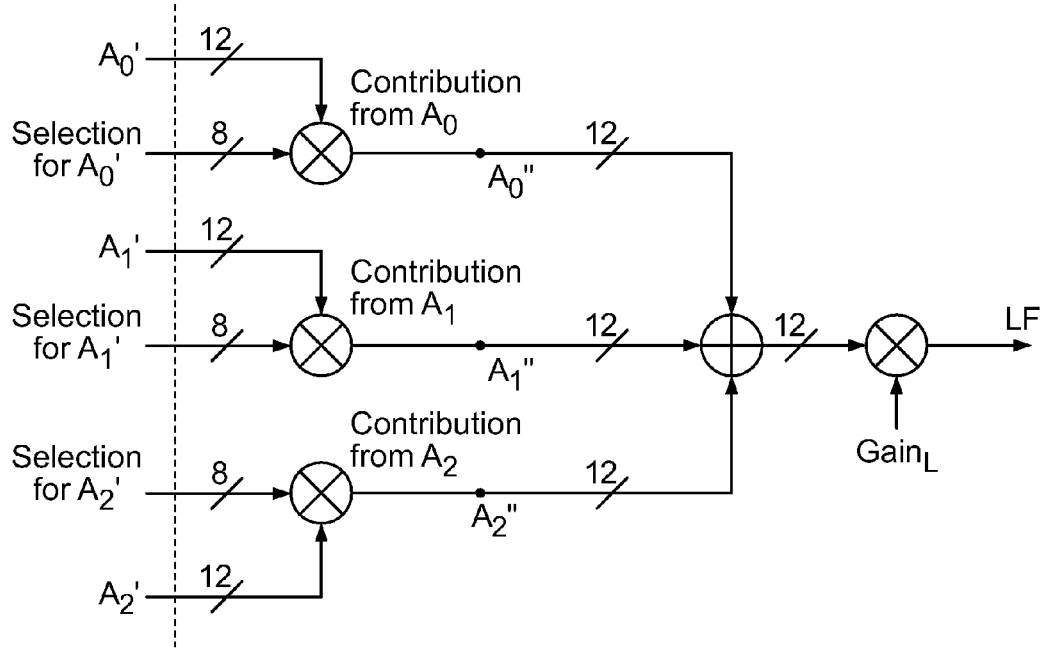
FIG. 26 is a block diagram illustrating the steps of salience selective fusion when contributions from all image modalities are combined into a single fused image.

Referring now to FIGS. 25 and 26, block diagrams depicting the steps of salience selection fusion from source Laplacian images of each of the modalities is depicted, constructed in accordance with a preferred embodiment of the present invention. Referring now to FIG. 25, an input image of a given modality is a Laplacian image at level l from source A. At block 116, the absolute value of the Laplacian image from source A is generated. At block 118, the resulting image is passed through a filter, $\text{Filt}_a$, which averages each pixel of the Laplacian image from source A with its surrounding pixels, and which convolves with the absolute value of the Laplacian image. The filter size may be a 1×1, or 3×3 or 5×5 normal filter. The resulting image, which represents the energy image of the Laplacian image from source A, is optionally multiplied by a user selected selection weight 120 and then optionally multiplied in block 122 with an optional ROI mask value, $\text{Mask}_A$. This static mask, $\text{Mask}_A$, is used to remove the static overlay in a source image or remove the border induced by warping or by a different source size. Since the source image sizes are known, and the camera poses are fixed, $\text{Mask}_A$ should have a known region of interest after calibration.

As discussed above, the source image ROI is generated after warping. The ROI information may be either calculated from the warping parameters or input externally. The pixel value of image A at point B in FIG. 26 is expressed in Eq. 37:

$$B_i(x,y) = \text{Selection\_Weight}_i \cdot \frac{\text{Mask}_i(x,y)}{2^p - 1} \cdot \text{Filt}(|L_i(x,y)|), \quad (37)$$

where $\sum_i \text{Mask}_i(x,y) = 2^p - 1,$ i is the index of the source images, $0 \leq i < s$, and p is the number of bits in ROI mask data representation. $|L_i(x,y)|$ is the absolute value image of the Laplacian image.

In block 122, a selection mask is generated based on the energy of the source Laplacian image at each pixel and corresponding pixels from each of the other source images 124. Based on energy/amplitude, the pixel with the highest amplitude is automatically chosen for the fusion result. In the present invention, the generated mask values for each pixel vary with the number of sources with similar energy. Each source image has a selection mask pyramid, which may be regarded as a mask with binary values. If one source at B has the maximum value compared to other sources at (x,y), then the selection mask for that source at (x,y) will be marked as 1, and the selection masks for other sources will have 0, respectively. This selection is processed for the whole pyramid. An 8-bit representation is used for the mask such that $2^p-1$ represents 1. If the sources have identical values at point B, the mask values may be set to ½, ⅓, etc., of the range $2^p-1$, depending on the total number of sources 124. In other embodiments, only one source gets the full value of $2^p-1$ while the other sources are set to values of 0. Table 1 lists the selection rule when there is no ROI mask, which lists the conditions of three input sources and their output after selection. $B_i(x,y)$ represents the value at position B in FIG. 25 from source i, and $C_i(x,y)$ is the selection mask (in p bits) in the same figure. Table 2 lists the selection rules when an ROI mask is present. If all mask values are not zero, then selection rule without ROI mask may be directly used.

TABLE 1

Selection without mask

| Comparison | Mask value (8-bit) | Notes |
|---|---|---|
| $B_i(x, y) > B_j(x, xy)$ | $C_i(x, y) = 255$ | |
| $B_i(x, y) > B_k(x, xy)$ | $C_j(x, y) = 0$ | |
| | $C_k(x, y) = 0$ | |
| $B_i(x, y) = B_j(x, y)$ | $C_i(x, y) = 128$ | |
| $B_i(x, y) > B_k(x, y)$ | $C_j(x, y) = 128$ | |
| | $C_k(x, y) = 0$ | |
| $B_i(x, y) = B_j(x, y) = B_k(x, y)$ | $C_i(x, y) = 85$ | |
| | $C_j(x, y) = 85$ | |
| | $C_k(x, y) = 85$ | |

TABLE 2

Selection with masks

| Mask | Comparison | Mask value (8-bit) | Notes |
|---|---|---|---|
| $M_i(x, y) \neq 0$, $\forall_i = 0, s-1$ | Use selection rule with no mask for $\{B_i(x, y), B_j(x, y), B_k(x, y)\}$ | $C_i(x, y), C_j(x, y)$, and $C_k(x, y)$ based on the comparison | |
| $M_i(x, y) = 0$ $M_j(x, y) \neq 0$ $M_k(x, y) \neq 0$ | Use selection rule with no mask for $\{B_j(x, y), B_k(x, y)\}$ | $C_i(x, y) = 0$ $C_j(x, y)$ and $C_k(x, y)$ based on the comparison | |
| $M_i(x, y) = 0$ $M_j(x, y) = 0$ $M_k(x, y) \neq 0$ | Use $B_k(x, y)$ | $C_i(x, y) = 0$ $C_j(x, y) = 0$ $C_k(x, y) = 255$ | |
| $M_i(x, y) = 0$ $M_j(x, y) = 0$ $M_k(x, y) = 0$ | | $C_i(x, y) = \text{const}$ $C_j(x, y) = \text{const}$ $C_k(x, y) = \text{const}$ | const = 0 |

The resulting image after applying the selection mask is filtered by $\text{Filt}_b$ in block 126 to reduce aliasing. The filter size used in a preferred embodiment is 5. The effect of block 126 is to more smoothly blend the contributions from each of the images, e.g., if image $A_1$ was selected originally at 1, its value may now be 0.9, while $A_2$ and $A_3$ may become 0.05 respectively. In order to get the contribution from a given source, e.g., Source A, at step 128, the filtered, selection masked image is multiplied with the Laplacian image (see Eq. 38).

Referring now to FIG. 26, the contributions from each masked Laplacian image, $A'_0$ to $A'_n$, having been multiplied by its corresponding source Laplacian image $A_0$ to $A_n$ after masking to produces the images $A''_0$ to $A''_n$, is summed together and the total multiplied by an optional user selectable gain factor, $\text{gain}_L$ to produce the fused image, LF. The fused Laplacian LF may be expressed in terms of the source Laplacian images at level l:

$$LF(x, y) = gain_L \cdot \sum_{i=0}^{s-1} \frac{SM_i(x, y)}{2^p - 1} \cdot \text{Laplacian\_Weight}_i \cdot A'_i(x, y), \quad (38)$$

where SM is the selection mask of the source images, and $\text{gain}_L$ is the output gain for the fused Laplacian.

Figure 27:
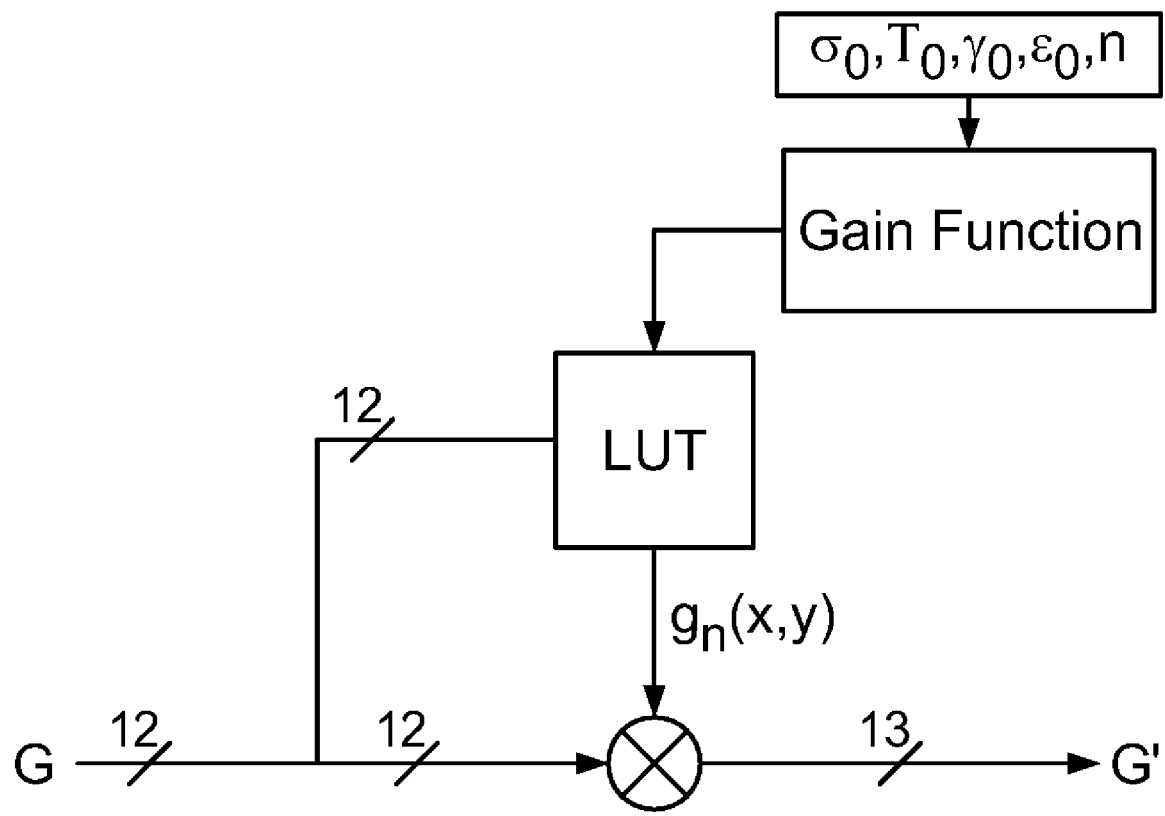
FIG. 27 is a block diagram illustrating the steps of salience selective fusion that generates the contrast normalized Gaussian image for the contribution of the highest level Gaussian input image.

Top-level Gaussian images contain the lowest frequency signals. FIG. 27 is a block diagram illustrating the steps of salience selective fusion that generates the contrast normalized Gaussian image for the contribution of the highest level Gaussian input image. $\sigma_k, \gamma$, and $\epsilon$ follow the Laplacian image rule. $T_k$ is the maximum value of the Gaussian image G. Unlike Laplacian contrast normalization that generates an energy map, the gain value for the Gaussian image is directly mapped from the original Gaussian image. The DC signals from multiple sources may be quite different. In order to maintain maximum dynamic range and high contrast, as discussed above, contrast normalization is used to shape top-level Gaussian images along with the scale on the AC component and offset on the DC level. Eq. 35 may be simplified to:

$$G'_n(x,y) = CN(G_n(x,y)), \quad (39)$$

$$G''_n(x,y) = \alpha_n(G'_n(x,y) - \overline{G}'_n) + \text{offset}_n, \quad (39a)$$

where $\overline{G}'_n$ is the spatial average of the contrast normalized Gaussian image, and $\alpha_n$ is the shape factor or gain factor (by default=1.0). The $\text{offset}_n$ is adjustable, and is often set to the middle value of the dynamic range of the data. If the ROI mask is used, then $$G''_i(x, y) = \frac{Mask_i(x, y)}{2^n - 1} \cdot G'_i(x, y).$$

Figure 28:
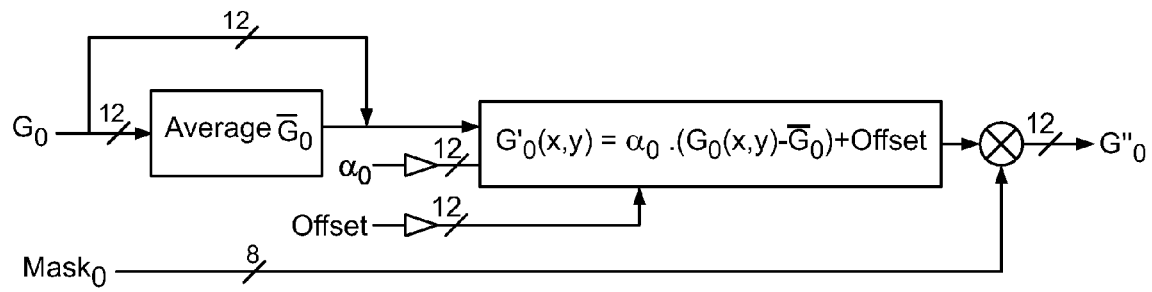
FIG. 28 is a block diagram illustrating the steps of salience selective fusion for the contribution of the highest level Gaussian input image with an ROI mask.

FIG. 28 is a block diagram illustrating the steps of salience selective fusion for the contribution of the highest level Gaussian input image with an ROI mask. The normalized Gaussian image is decomposed into an average value and an AC component. Both of them may be tuned by an offset and a scale factor $\alpha$. The mask image acts as an outlier that removes unnecessary areas of the image.

Figure 29:
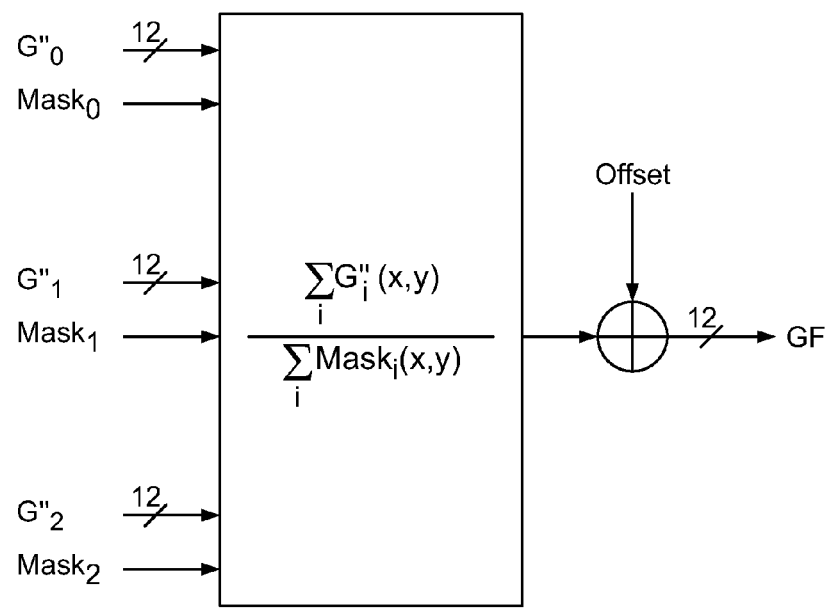
FIG. 29 is a block diagram illustrating the steps of salience selective fusion for the contributions from all modalities of the highest level Gaussian images with ROI mask.

At the top level, the fused image, GF, is the weighted average of the source Gaussian images $G''_0$ to $G''_n$. FIG. 29 shows the weighted average when ROI masks $\text{Mask}_0$ to $\text{Mask}_n$ are used. Without the ROI masks, the contribution from each source Gaussian is equal. There is another offset defined in FIG. 29 to allow additional adjusting of the DC level in the simulation, which may not be necessary in the hardware design.

Flickering is often seen in the fusion of LWIR and SWIR/TV modalities when both sources contain reverse intensities at the same locations. For example, at (x,y) in the Laplacian images at level n, the selection rule would pick LWIR over the SWIR at time t, and then may pick SWIR over LWIR at time t+1. This randomness is mostly determined by noise. In order to reduce the flicker, hysteresis may be employed. A hysteresis function is defined that remembers the selection from the last frame. If the source at a sample position (x,y) is selected the last time, then the salience energy for this source image is incremented from its last selection. The boosted energy is then used in the selection to determine the new selection mask. The higher the hysteresis factor, the better the chances that the last selected source wins a subsequent selection.

In the present invention, each source modality pyramid has a hysteresis mask pyramid. The mask value h_mask(x,y) at a pyramid level n is determined by the following rule:

If at least one source image is picked, then
$$h\_mask(x, y) = \frac{1}{accumu},$$
where accumu = number of sources that share the same max value;
else
$$h\_mask(x, y) = -1.$$

Eq. 37 may then be modified after using the hysteresis:

$$B_i(x, y) = \text{Selection\_Weight} \cdot \frac{Mask_i(x, y)}{2^n - 1} \cdot \quad (40)$$
$$Filt(|L_i(x, y)|) \cdot (1 + h\_weight \cdot h\_mask(x, y)),$$

where h_weight is the hysteresis factor, and h_weight $\epsilon[0,1]$.

Pyramid reconstruction starts from the adapted Gaussian image. Each Gaussian image is up-sampled to the lower level if there exists a non-trivial scaling factor between two levels of images. The expanded Gaussian image is then added to the filter-boosted (convolve with 1+w) Laplacian to form the Gaussian at that level. This process is repeated until level 0 is reached.

When fusing a color image with other images of different spectra (e.g., LWIR, SWIR, TV) it is customary to first decompose the color image into luminance and chrominance components. Then, the luminance component from the color image fuses with images of other modalities. The fused result then combines with the chrominance component to form the final output image. The color space is chosen such that the luminance part of the image may be processed without affecting its color component. YUV and HSV color spaces have been used in pattern-selective fusion. YUV is the basic color space used in analogue color TV broadcasting. The color difference, or chrominance components (UV), are formed by subtracting luminance from blue and from red.

The HSV (hue, saturation, value) color space was developed to be more "intuitive" in decomposing color and was designed to approximate the way humans perceive and interpret color. Hue defines the color itself; saturation indicates the degree to which the hue differs from a neutral gray, and value indicates the illumination level. In Ruderman, D. L., Cronin, T. W., and Chiao, C., "Statistics of Cone Reponses to Natural Images: Implications for Visual Coding," *JOSA A*, 15(8), 2036-2045, 1998, an lαβ color space was developed in the context of understanding the perception of the human visual system, and it was believed that this space would provide least correlation between axes and any operation in one color channel would not create distortion and artifacts to other channels. A feature of this space is its non-linearity. The l axis is the luminance channel, and α and β channels are chromatic yellow-blue and red-green channels. Generally speaking, the orthogonalization of a color image is a complicated problem, which is related to the capturing device, the display device, and human perception. In the present invention, instead of concentrating on the selection of a color space, what is sought are orthogonal bases in a color space based on the imaging system.

Figure 30:
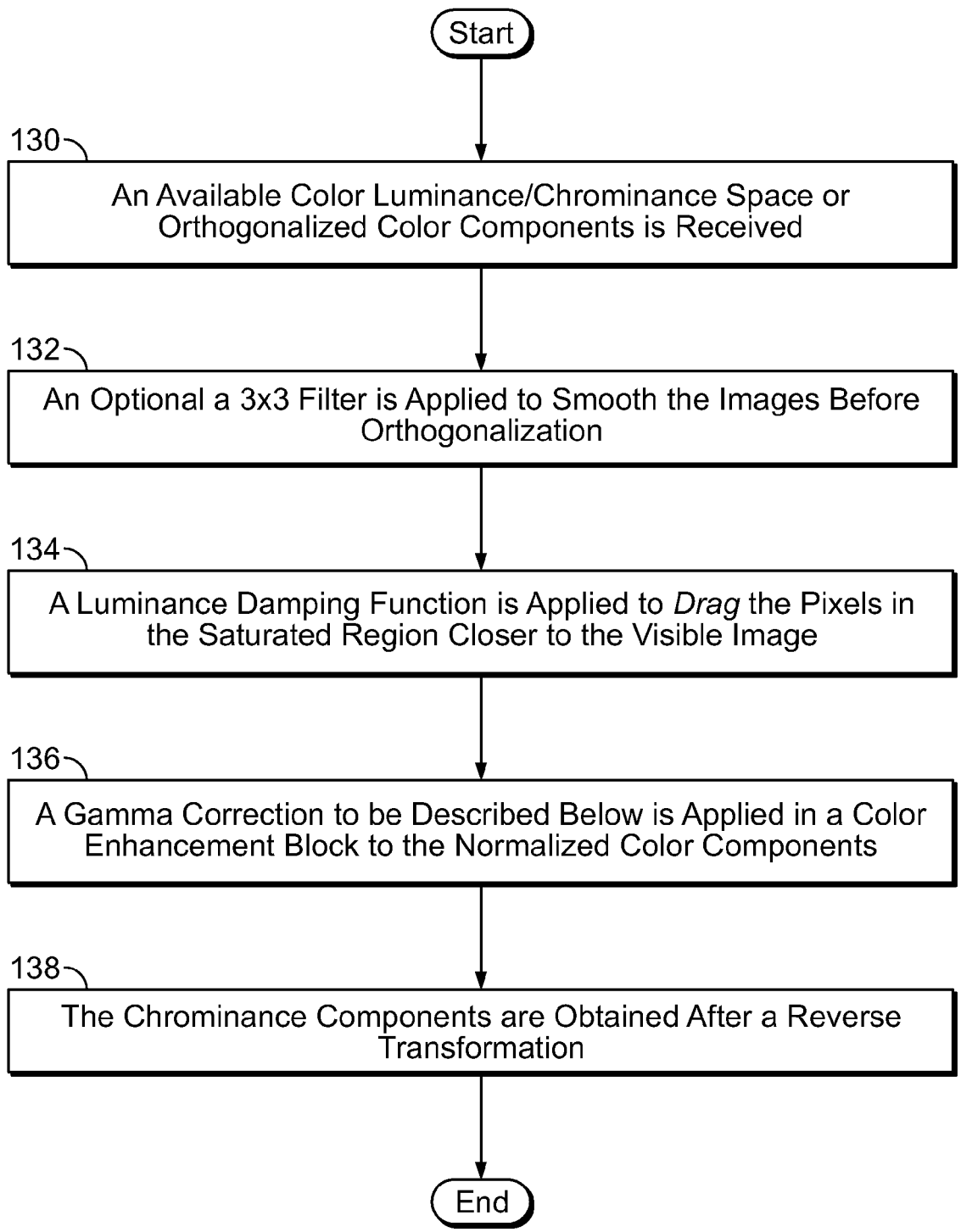
FIG. 30 is a flow chart of a method for fusing and enhancing color into an output image that has itself been subject to contrast normalization and adaptive fusion of the luminance portion of an input image with other modalities.
Figure 31:
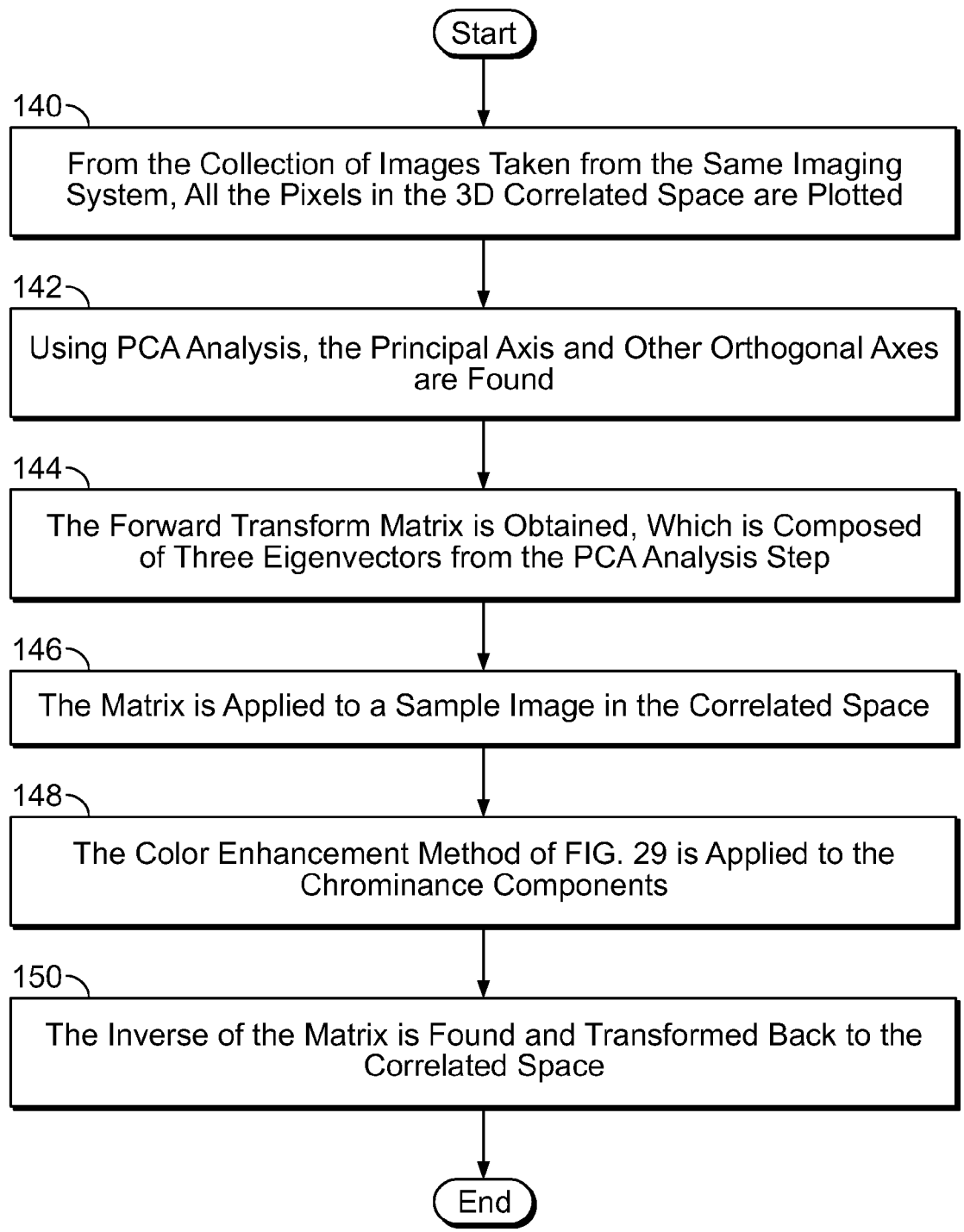
FIG. 31 is a flow chart of a method for orthogonalizing a correlated color space.

Referring now to FIG. 30, a method for fusing and enhancing color into an output image that has itself been subject to contrast normalization and adaptive fusion of the luminance portion of an input image with other modalities is depicted. Beginning with RGB images comprising, for example, at step 130, the fused output Y luminance image and the chrominance images (UV) from the visible input image, an available color luminance/chrominance space (e.g., YUV or HSV) or orthogonalized color components obtained via a calculated forward transform matrix is received. If color values are small and noisy, at step 132, an optional a 3×3 filter is applied to smooth the images before the orthogonalization. In order to recover the chrominance in a saturated region, at step 134, a luminance damping function is applied to drag the pixels in the saturated region closer to the visible image. At step 136, a gamma correction to be described below is applied in a color enhancement block to the normalized color components. The gamma function is also a function of the luminance change between the visible image and the fused image ($Y^1$-$Y^1_F$). At step 138, the chrominance components are obtained after a reverse transformation.

The problem to be solved may be stated as follows: given a color image YUV (or any orthogonal color space), where Y is the luminance, and UV is the chrominance, assume Y changes, what are the changes to UV so that the color is preserved and the color image is optimal based on some criteria? Theoretically, if YUV are the true decoupled (orthogonal) bands, changes in Y do not require any change to chrominance (UV). In real applications, a few exceptions require changes in chrominance. For example, when UV is small, and the change in Y is large, color is not fully expressed in the result image; second, when fused Y is saturated, the color fades away; last, the color bands in the captured images are often not orthogonal. This implies that directly converting RGB to other color spaces may not fully decouple the luminance from the chrominance. The change in luminance will result in color skew in the fused image. The solutions to the first and second problem are discussed in sections on Luminance Damping and Chrominance Gamma correction. The orthogonalization of image bands is discussed in a section on Orthogonalization of Color Bands.

Luminance Damping

When fusion luminance $Y_F$ is near saturation, the color in the nearly saturated region is washed away. To get the color back, a damping function is defined to "drag" $Y_F$ toward Y when $|Y_F-Y|$ is large:

$$Y'_F = (Y_F - Y)e^{-\frac{|Y_F - Y|}{k}} + Y, \quad (41)$$

where k is the damping factor that controls the damping rate. Since k is much larger than the dynamic range of the image, for hardware implementation, Eq. 41 may be Taylor-expanded to its first order components:

$$Y'_F = (Y_F - Y)\left(1 - \frac{|Y_F - Y|}{k}\right) + Y, \quad (42)$$

Chrominance Gamma Correction

In color enhancement, U and V are normalized to be within [−1,1]. If U and V are an unsigned byte image, then the normalized u and v are expressed as follows:

$$u = \frac{U - R_u}{R_u}, \quad v = \frac{V - R_v}{R_v}, \tag{43}$$

$R_u$ and $R_v$ are the ranges of U and V band respectively. If U and V are not 8-bit, $R_u$ and $R_v$ may be replaced with a proper range. The color enhancement is similar to the gamma correction formula. The differences are that color enhancement is only applied to the chrominance channels, and the gamma index is a function of the luminance difference at each pixel as shown in Eq. 44 as follows:

$$u' = sign(u) \cdot |u|^{\frac{Y - Y_F}{a} + b}, \tag{44}$$
$$v' = sign(v) \cdot |v|^{\frac{Y - Y_F}{a} + b},$$
where
$$\begin{cases} x >= 0, sign(x) = 1 \\ x < 0, sign(x) = -1, \end{cases}$$

b is between [0, 1], and a is larger than the range of the image. For byte images in a preferred embodiment, b=0.7, a=2048, and k=2048 are chosen as default values. The default range for these parameters are: b∈[0.3,1.0], a∈[512,2048], and k∈[512,2048].

In order to reduce noise, a linear relationship is defined between u and u', and v and v' when they are smaller than a threshold value:

If$|u|$<thresh,$u'=gu$;

If$|v|$<thresh,$v'=gv$, (45)

where g is the gain, and thresh is a small value between [0,1]. If the absolute value is less than the threshold, Eq. 45 is used; otherwise, Eq. 44 is used. A more complicated relation may be defined so that Eq. 44 and 45 may be connected with higher order continuity.

In HSV color space, the change of value conforms to Eq. 42, and hue is preserved. Saturation is used to enhance the color. Assume S is in the range of [0,1], then $$S' = S^{\frac{V - V_F}{a} + b}. \tag{46}$$

Orthogonalization of Color Bands

Color orthogonalization is used to preserve a color band when other bands are changed. Generally speaking, most of the defined color spaces have the intensity decoupled from the color information. The decomposition of a correlated space into orthogonal components may be used in the present invention for the basis of color enhancement. The method for orthogonalizing a correlated color space is described in FIG. 30. At step 140, from the collection of images taken from the same imaging system, all the pixels in the 3D correlated space are plotted, e.g., RGB. The image set should contain different colors and luminance. The 3D pixel cloud generally looks like a football. At step 142, using PCA analysis (PCA stands for Principle Component Analysis. PCA aims to find 3 principle axes from a 3-D cloud. If the color space is truly orthogonalized, then YUV shall become the 3 principle axes.), the principal axis and other orthogonal axes are found. The principal axis is always the luminance channel, and the other two are chrominance. At step 144, the forward transform matrix is obtained, which is composed of three eigenvectors from the PCA analysis. At step 146, the matrix is applied to a sample image in the correlated space. At step 148, the color enhancement method of FIG. 30 is applied to the chrominance components. At step 150, the inverse of the matrix is found and transformed back to the correlated space.

If the imaging system has non-uniformity noise, or the physical characteristics of pixels on the sensor are irregular, then the above method does not apply. Since the calibration matrix entirely relies on the sample images, the collection of these images are such that they represent the full stretch of the color and luminance. If the imaging system is not calibrated, the YUV or HSV or lαβ space is used, as each is very close to the orthogonal space.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer implemented method for fusing images taken by a plurality of cameras, comprising the steps of:
   receiving a plurality of images of the same scene taken by the plurality of cameras;
   generating Laplacian pyramid images for each source image of the plurality of images;
   generating saturation mask pyramids of the generated Laplacian pyramid images;
   applying contrast normalization to the Laplacian pyramids images based on the generated saturation mask pyramids;
   performing pixel-level fusion on the Laplacian pyramid images based on a local salience measure that reduces aliasing artifacts to produce one salience-selected Laplacian pyramid image for each pyramid level; and
   combining the salience-selected Laplacian pyramid images into a fused image.

2. The method of claim 1, wherein the step of performing pixel-level fusion further comprises the steps of, for each level of the Laplacian pyramid images corresponding to each source image of the plurality of images:
   passing a Laplacian pyramid image through a filter which average each pixel with surrounding pixels;
   convolving the filtered Laplacian pyramid image with the absolute value of the Laplacian pyramid image to produce an energy image;
   generating a selection mask wherein a pixel at a given location is selected based on comparing the energy of the pixels originating from energy images corresponding each of the source images; and
   multiplying the selection mask by a filter to reduce aliasing artifacts by smoothing the contributions to the selection mask from each of the energy images to produce a contribution image.

3. The method of claim 2, further comprising the step of summing contribution images corresponding to each of the source images to produce the salience-selected Laplacian pyramid image at one level of a Laplacian pyramid.

4. The method of claim 2, wherein the pixel that is selected at a given location is the pixel among the energy images corresponding to each source image which has the highest energy when only one pixel has the highest energy; otherwise, partial contributions from each of the pixels from each of the sources which have about the same energy are selected.

5. The method of claim 2, wherein the pixel that is selected at a given location is the pixel among the energy images corresponding to each source image which has the highest energy.

6. The method of claim 2, further comprising the step of multiplying the energy image with a region of interest (ROI) mask to remove a static overlay in a source image or remove the border induced by warping or by a different source size.

7. The method of claim 4, further comprising the step of incrementing a selected pixel by a hysteresis factor to reduce flickering artifacts.

8. The method of claim 1, wherein the step of generating Laplacian pyramid images further comprises the steps of:
generating a Gaussian pyramid for at least one of the plurality of images; and
applying noise coring to at least the Level 0 Gaussian image of the Gaussian pyramid to produce a noise-cored Laplacian image.

9. The method of claim 8, wherein said step of applying noise coring further comprising the steps of:
processing at least the Level 0 Gaussian image substantially simultaneously through a plurality of derivative (gradient) filters to produce a first set of gradient images;
applying a noise coring function to each of the gradient images;
processing the noise cored gradient images substantially simultaneously through a second set of derivative (gradient) filters; and
negatively summing the resulting filtered/cored images to produce a the noise-cored Laplacian image.

10. The method of claim 1, wherein the step of applying contrast normalization further comprises the steps of, for each Laplacian image at a given level:
obtaining an energy image from the Laplacian image;
determining a gain factor that is based on at least the energy image and a target contrast; and
multiplying the Laplacian image by a gain factor to produce a normalized Laplacian image.

11. The method of claim 10, wherein the target contrast is halved with increasing pyramid level.

12. The method of claim 10, wherein the gain factor undergoes noise coring.

13. The method of claim 11, wherein the degree of noise coring is halved with increasing pyramid level.

14. The method of claim 10, wherein a saturation mask is applied to the gain factor.

15. The method of claim 1, further comprising the step of generating ROI mask pyramids.

16. The method of claim 1, further comprising the step of applying a non-uniformity correction (NUC) to each of the plurality of images to produce corrected images.

17. The method of claim 16, further comprising the step of applying at least one of linear stretching, uniform histogram equalization, Rayleigh shape histogram equalization, Gaussian shape histogram equalization, and gamma correction to each of the plurality of images to produce preprocessed images.

18. The method of claim 17, further comprising the step of warping the preprocessed images to align the preprocessed images to each other.

19. The method of claim 1, wherein one of the plurality of images has a modality which encompasses at least a portion of the visible range of frequencies.

20. The method of claim 19, wherein the one of the plurality of images is separated into a luminance component and chrominance components, wherein the luminance component is contrast normalized and undergoes image fusion, and the chrominance component is combined with the fused image to produce a color enhanced fused image.

21. The method of claim 20, further comprising the steps of:
applying a luminance damping function to the luminance component; and
applying a gamma correction to the chrominance components.

22. The method of claim 21, further comprising the step of orthogonalizing the chrominance components.

23. An apparatus for fusing images taken by a plurality of cameras, comprising:
a processor configured for executing instructions comprising the steps of:
receiving a plurality of images of the same scene taken by the plurality of cameras;
generating saturation mask pyramids of the generated Laplacian pyramid images;
applying contrast normalization to the Laplacian pyramids images based on the generated saturation mask pyramids;
performing pixel-level fusion on the Laplacian pyramid images based on a local salience measure that reduces aliasing artifacts to produce one salience-selected Laplacian pyramid image for each pyramid level; and
combining the salience-selected Laplacian pyramid images into a fused image.

24. The apparatus of claim 23, wherein performing pixel-level fusion further comprises, for each level of the Laplacian pyramid images corresponding to each source image of the plurality of images:
passing a Laplacian pyramid image through a filter which average each pixel with surrounding pixels;
convolving the filtered Laplacian pyramid image with the absolute value of the Laplacian pyramid image to produce an energy image;
generating a selection mask wherein a pixel at a given location is selected based on comparing the energy of the pixels originating from energy images corresponding each of the source images; and
multiplying the selection mask by a filter to reduce aliasing artifacts by smoothing the contributions to the selection mask from each of the energy images to produce a contribution image.

25. The apparatus of claim 24, wherein the processor is further configured for executing instructions comprising the step of summing contribution images corresponding to each of the source images to produce the salience-selected Laplacian pyramid image at one level of a Laplacian pyramid.

26. The apparatus of claim 24, wherein the pixel that is selected at a given location is the pixel among the energy images corresponding to each source image which has the highest energy when only one pixel has the highest energy; otherwise, partial contributions from each of the pixels from each of the sources which have about the same energy are selected.

27. The apparatus of claim 26, wherein the processor is further configured for executing instructions comprising the step of incrementing a selected pixel by a hysteresis factor to reduce flickering artifacts.

28. The apparatus of claim 23, wherein applying contrast normalization further comprises, for each Laplacian image at a given level:
obtaining an energy image from the Laplacian image;
determining a gain factor that is based on at least the energy image and a target contrast; and multiplying the Laplacian image by a gain factor to produce a normalized Laplacian image.

29. The apparatus of claim 23, wherein the one of the plurality of images is separated into a luminance component and chrominance components, wherein the luminance component is contrast normalized and undergoes image fusion, and the chrominance component is combined with the fused image to produce a color enhanced fused image.

30. The apparatus of claim 29, wherein the processor is further configured for executing instructions comprising the steps of:
   applying a luminance damping function to the luminance component; and
   applying a gamma correction to the chrominance components.

31. A non-transitory computer-readable medium carrying one or more sequences for fusing images taken by a plurality of cameras, wherein execution of the one of more sequences of instructions by one or more processors causes the one or more processors to perform the steps comprising:
   receiving a plurality of images of the same scene taken by the plurality of cameras;
   generating saturation mask pyramids of the generated Laplacian pyramid images;
   applying contrast normalization to the Laplacian pyramids images based on the generated saturation mask pyramids;
   performing pixel-level fusion on the Laplacian pyramid images based on a local salience measure that reduces aliasing artifacts to produce one salience-selected Laplacian pyramid image for each pyramid level; and
   combining the salience-selected Laplacian pyramid images into a fused image.

32. The computer readable medium of claim 31, wherein the step of performing pixel-level fusion further comprises the steps of, for each level of the Laplacian pyramid images corresponding to each source image of the plurality of images:
   passing a Laplacian pyramid image through a filter which average each pixel with surrounding pixels;
   convolving the filtered Laplacian pyramid image with the absolute value of the Laplacian pyramid image to produce an energy image;
   generating a selection mask wherein a pixel at a given location is selected based on comparing the energy of the pixels originating from energy images corresponding each of the source images; and
   multiplying the selection mask by a filter to reduce aliasing artifacts by smoothing the contributions to the selection mask from each of the energy images to produce a contribution image.

33. The computer readable medium of claim 32, wherein the one or more processors are further configured to perform the step comprising summing contribution images corresponding to each of the source images to produce the salience-selected Laplacian pyramid image at one level of a Laplacian pyramid.

34. The computer readable medium of claim 32, wherein the pixel that is selected at a given location is the pixel among the energy images corresponding to each source image which has the highest energy when only one pixel has the highest energy; otherwise, partial contributions from each of the pixels from each of the sources which have about the same energy are selected.

35. The computer readable medium of claim 34, wherein the one or more processors are further configured to perform the step comprising incrementing a selected pixel by a hysteresis factor to reduce flickering artifacts.

36. The computer readable medium of claim 31, wherein the step of applying contrast normalization further comprises the steps of, for each Laplacian image at a given level:
   obtaining an energy image from the Laplacian image;
   determining a gain factor that is based on at least the energy image and a target contrast; and
   multiplying the Laplacian image by a gain factor to produce a normalized Laplacian image.

37. The computer readable medium of claim 31, wherein the one of the plurality of images is separated into a luminance component and chrominance components, wherein the luminance component is contrast normalized and undergoes image fusion, and the chrominance component is combined with the fused image to produce a color enhanced fused image.

38. The computer readable medium of claim 37, wherein the one or more processors are further configured to perform the steps comprising:
   applying a luminance damping function to the luminance component; and
   applying a gamma correction to the chrominance components.

* * * * *